United States Patent [19] [11] Patent Number: 6,025,407
Nagy et al. [45] Date of Patent: Feb. 15, 2000

[54] PHOTO-POLYMERIZATION OF VINYL CHLORIDE USING METALLOCENE CATALYSTS

[75] Inventors: Sandor M. Nagy, Grand Island; Ramesh Krishnamurti, Williamsville; Mary K. Cocoman, Grand Island; Walter M. Opalinski, Tonawanda; Thomas F. Smolka, West Seneca, all of N.Y.

[73] Assignee: Occidental Chemical Corporation, Dallas, Tex.

[21] Appl. No.: 08/961,516

[22] Filed: Oct. 30, 1997

[51] Int. Cl.[7] .................................. C08F 2/46; C08F 4/06
[52] U.S. Cl. .......................... 522/29; 522/187; 522/184; 522/66; 526/126
[58] Field of Search ............................... 522/187, 29, 66, 522/185, 184, 189; 526/127

[56] References Cited

U.S. PATENT DOCUMENTS

| | | | |
|---|---|---|---|
| 2,762,769 | 9/1956 | Smith | 522/187 |
| 3,364,190 | 1/1968 | Emrick | 260/93.7 |
| 3,886,130 | 5/1975 | Lim et al. | 260/92.8 R |
| 4,049,517 | 9/1977 | Adachi et al. | 204/159 |
| 4,892,851 | 1/1990 | Ewen et al. | 502/104 |
| 4,927,797 | 5/1990 | Ewen | 502/127 |
| 5,089,536 | 2/1992 | Palazzotta | 522/16 |
| 5,223,467 | 6/1993 | Razavi | 502/152 |
| 5,225,500 | 7/1993 | Elder et al. | 526/127 |
| 5,243,002 | 9/1993 | Razavi | 526/170 |
| 5,432,139 | 7/1995 | Shamshoum | 502/125 |
| 5,468,707 | 11/1995 | Pohl et al. | 502/153 |
| 5,614,457 | 3/1997 | Ewen et al. | 502/117 |
| 5,670,595 | 9/1997 | Meka et al. | 526/336 |
| 5,677,405 | 10/1997 | Goodall et al. | 526/281 |
| 5,756,611 | 5/1998 | Etherton et al. | 526/127 |
| 5,807,800 | 9/1998 | Shamshoum et al. | 502/104 |

FOREIGN PATENT DOCUMENTS

| | | |
|---|---|---|
| 0227003 | 1/1988 | European Pat. Off. . |
| 0227004 | 1/1988 | European Pat. Off. . |
| 208736 | 5/1995 | Japan . |
| 08208736 | 8/1996 | Japan . |

OTHER PUBLICATIONS

P.W.N.M. Vand Leeuwen et al., "Photogeneration of Reactive Titanium and Zirconium Species: a CIDNP Study," *Journal of Organometallic Chemistry*, 209 (1981) 169–182.

*Primary Examiner*—James J. Seidleck
*Assistant Examiner*—Sanza L. McClendon
*Attorney, Agent, or Firm*—Anne E. Brookes; Richard D. Fuerle

[57] ABSTRACT

Disclosed is a process for polymerizing vinyl chloride monomer in the presence of light. A mixture is formed of liquid vinyl chloride monomer, preferably about 10 to about 250 ppm of a metallocene catalyst, about 1 to about 2000 moles of an aluminum-containing cocatalyst per mole of catalyst, and up to about 500 moles of a Lewis base per mole of aluminum in the cocatalyst. Selected alkyl groups from the aluminum-containing cocatalyst can be placed on the ends of the poly (vinyl chloride) chains.

35 Claims, 7 Drawing Sheets

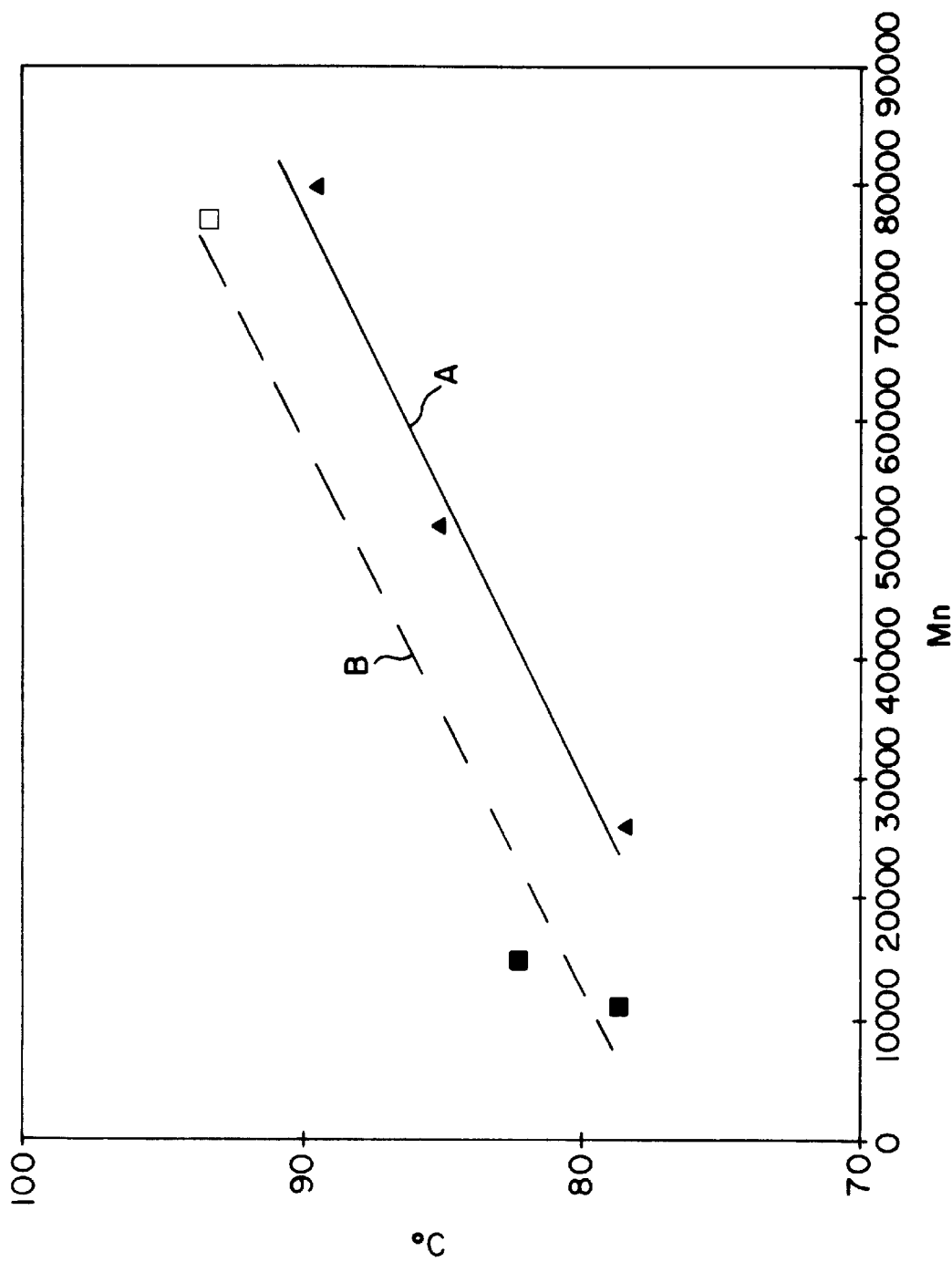

PHOTO-POLYMERIZATION OF VINYL CHLORIDE USING METALLOCENE CATALYSTS

BACKGROUND OF THE INVENTION

This invention relates to the photopolymerization of vinyl chloride using metallocene catalysts. In particular, it relates to the photopolymerization of vinyl chloride using cyclopentadienyl or cyclopentadienyl-type transition metal catalysts in the presence of an aluminum-containing cocatalyst and an optional base.

Vinyl chloride monomer (VCM) is commercially polymerized to produce poly(vinyl chloride) (PVC) using peroxide initiators. Because peroxides are unstable and can even be explosive, they must be handled and stored very carefully at low temperatures, which complicates and adds to the cost of the manufacturing process. Moreover, elevated temperatures are usually required in polymerization reactions initiated by peroxides (50 to 80° C.), which can deteriorate the properties of the product. The free-radical nature of the traditional polymerization process implies that the product properties, such as tacticity, molecular weight, and polydispersity, are not influenced in any way by the structure or composition of the free-radical initiator.

BRIEF DESCRIPTION OF THE DRAWINGS

FIG. 5 shows the relationship between glass transition temperature ($T_g$ in °C.) and $M_n$ for commercial PVC samples and for resins prepared according to this invention.

SUMMARY OF THE INVENTION

Figure 1:
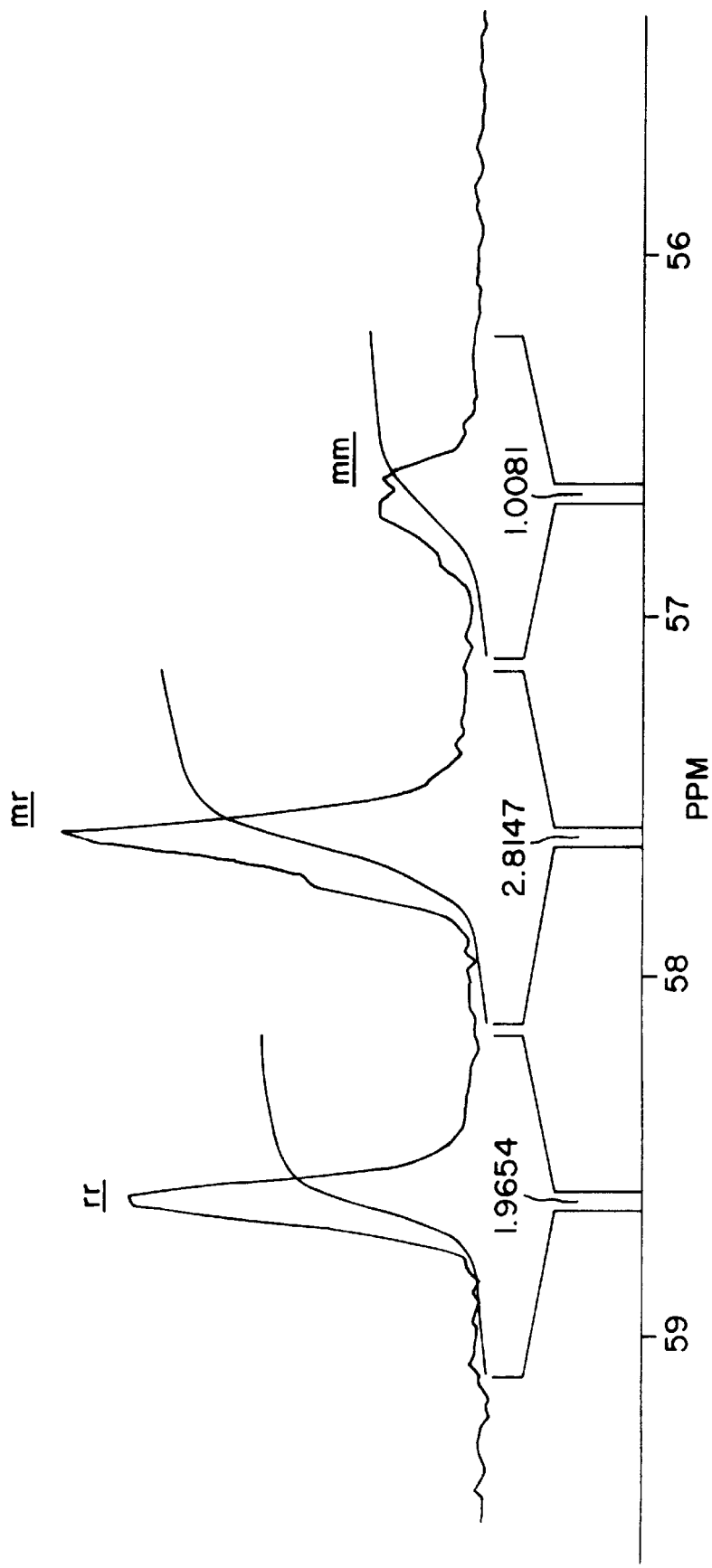
FIG. 1 is a $^{13}C$ nuclear magnetic resonance (NMR) spectrum of PVC prepared according to this invention.

We have discovered that vinyl chloride can be polymerized using metallocene catalysts if light is present. We further discovered that the activity of the catalyst can be enhanced by the presence of a cocatalyst and a base.

PVC made according to this invention is of superior quality. Nuclear magnetic resonance (NMR) studies of PVC produced according to this invention indicate a substantially lower level of unsaturated end groups compared with polymers made using traditional free radical polymerized PVC A unique aspect of this invention is the ability of an optional base to enhance the transfer of alkyl groups from the aluminum cocatalyst to the growing polymer macroradical. This has two effects. First, it terminates the growing polymer chain, thereby limiting the molecular weight of the PVC. Thus, it is possible to produce ultra-low molecular weight PVC (i.e., $M_n$<20,000) in bulk at room temperature. Second, it alters the properties of the PVC by placing unique alkyl groups at the ends of the PVC chains. PVC having tailored properties that are unobtainable by other means can therefore be produced by the process of this invention.

DESCRIPTION OF THE PREFERRED EMBODIMENTS

In the practice of this invention, VCM is polymerized in the presence of light using a metallocene catalyst and an aluminum-containing cocatalyst.

The Metallocene Catalyst

The amount of metallocene catalyst should be about 2 to about 250 ppm (based on monomer weight) as less catalyst is ineffective and more catalyst is unnecessary. The preferred amount of metallocene catalyst is about 50 to about 125 ppm.

Almost any metallocene catalyst can be used in this invention, where "metallocene" means a transition metal pi bonded to at least one cyclopentadienyl group or to a group containing a cyclopentadienyl ring or to a group containing a cyclopentadienyl-type of ring, i.e., a heterocyclic ring that is anionic, has 6 pi electrons for bonding, and is isoelectronic with a cyclopentadienyl ring.

A metallocene catalyst can have a general formula:

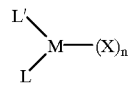

where each X is independently selected from halogen, alkyl from $C_1$ to $C_{30}$, oxyalkyl or oxyaryl from $C_1$ to $C_{30}$, or —N(R')$_2$, where each R' is independently selected from hydrogen, alkyl from $C_1$ to $C_{10}$, aryl from $C_6$ to $C_{15}$, alkaryl from $C_7$ to $C_{15}$, and aralkyl from $C_7$ to $C_{17}$, L is a ligand containing a cyclopentadienyl ring or an anionic heterocyclic ring that is isoelectronic with a cyclopentadienyl ring, L' is L or X, M is a Group IV transition metal, and n, the valency of M minus 2, is 1, 2, or 3. The transition metal is preferably titanium, zirconium, or hafnium because those catalysts are believed to be superior; zirconium is most preferred as zirconium catalysts tend to produce a PVC that is less colored. The X group is preferably halogen or alkyl from $C_1$ to $C_4$ and is most preferably chlorine or methyl as those catalysts are easier to make. The L and L' ligands are preferably independently selected from cyclopentadienyl and indenyl as those catalysts are easier to prepare and have good activity.

Examples of L groups include ligands containing (1) a cyclopentadienyl ring, (2) a borabenzene ring, (3) a 1,2-azaborolinyl ring, or (4) a pyrrolyl or phospholyl ring.

Cyclopentadienyl Catalysts

L can have the formula:

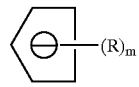

where each R is independently selected from hydrogen, silyl (such as Si(CH$_3$)$_3$), germyl, cyano, R"OR", or halogen, where R" is a $C_1$ to $C_{20}$ hydrocarbyl group (such as alkyl, alkenyl, aryl, alkylaryl, or arylalkyl), preferably a $C_1$ to $C_6$ group, and 'm' is 1 to the maximum number of substituents on the ring. Alternatively, the R group can be a fused $C_4$ to $C_6$ ring, with other groups on the two rings optionally substituted with R groups.

Examples of alkyl substituted Cp rings include butyl cyclopentadienyl, methyl cyclopentadienyl, and pentamethylcyclopentadienyl (Cp*) and examples of fused ring systems include indenyl and fluorenyl:

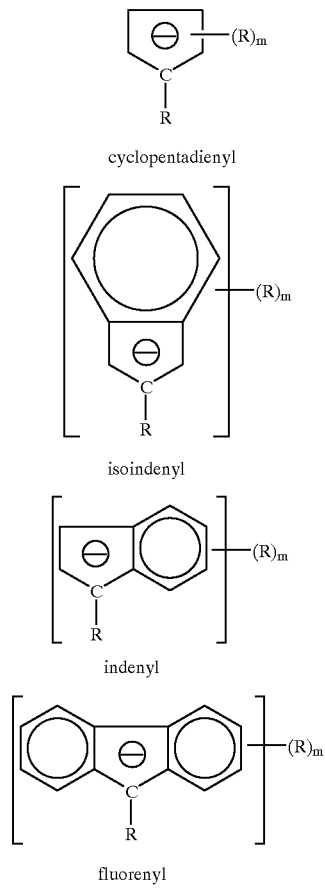

Examples of ligands containing fused ring systems include 2-ethylindenyl, tetrahydroindenyl, 2,2'-dimethylfluorenyl, and 2-methylindenyl.

Borabenzene Catalysts

L can contain the group:

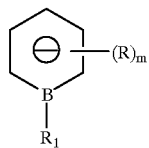

where $R_1$ is hydrogen, $N(R')_2$, $OR'$, or $R'$ and is preferably —$N(R')_2$ or phenyl, as those catalysts have the best properties; if $R_1$ is —$N(R')_2$, then $R'$ is preferably methyl. Examples of ligands containing a borabenzene ring include:

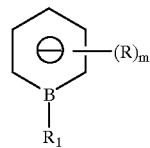

borabenzene

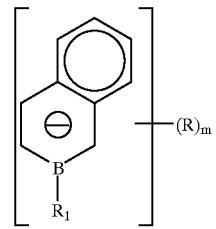

2-borabenzene

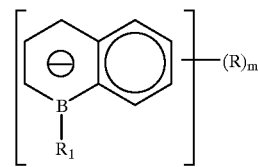

1-boranaphthalene

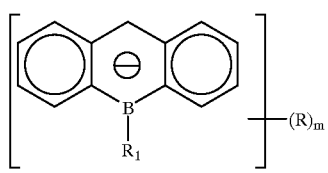

boraanthracene

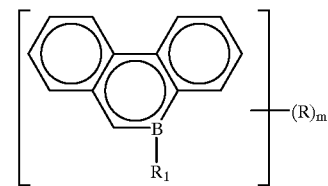

boraphenanthrene

Examples of metallocene catalysts containing borabenzene rings include:

(1-methyl borabenzene)zirconium trichloride;
(1-ethyl borabenzene)zirconium trichloride;
(1-tert-butyl borabenzene)zirconium trichloride;
(N,N-dimethyl-1-aminoborabenzene)zirconium trichloride;
(N,N-diethyl-1-aminoborabenzene)zirconium trichloride;
(9-mesityl-9-boraanthracene)zirconium trichloride;
(9-phenyl-9-boraanthracene)zirconium trichloride;
(9-methyl-9-boraanthracene)zirconium trichloride;
(9-ethyl-9-boraanthracene)zirconium trichloride;
(N,N-dimethyl-9-amino-9-boraanthracene)zirconium trichloride;
(N,N-diethyl-9-amino-9-boraanthracene)zirconium trichloride; and
(N,N-dimethyl-1-amino-3,5-dimethyl borabenzene) zirconium trichloride.

The preferred borabenzene-containing ligands are borabenzene, boranaphthalene, and boraanthracene because those catalysts are easier to prepare.

Azaborolinyl Catalysts

L can have the formula:

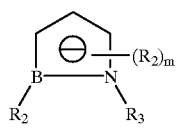

where $R_2$ is alkyl from $C_1$ to $C_{12}$ or aryl from $C_6$ to $C_{12}$, alkaryl from $C_6$ to $C_{12}$, aralkyl from $C_6$ to $C_{12}$, or $Si(R')_3$, $R_3$ is $R_2$, halogen, COR', COOR', SOR', or SOOR', and R' is alkyl from $C_1$ to $C_{10}$, aryl from $C_6$ to $C_{15}$, alkaryl from $C_7$ to $C_{15}$, or aralkyl from $C_7$ to $C_{15}$. The $R_2$ group on the boron is preferably alkyl from $C_3$ to $C_{12}$ or aryl, the $R_3$ group is preferably t-butyl or trimethylsilyl, and the $R_2$ group on the ring is preferably hydrogen or methyl as those compounds are easier to make. Fused ring systems containing the 1,2-azaborolinyl ring typically contain four to six carbon atoms. Examples of fused ring structures that can be used include:

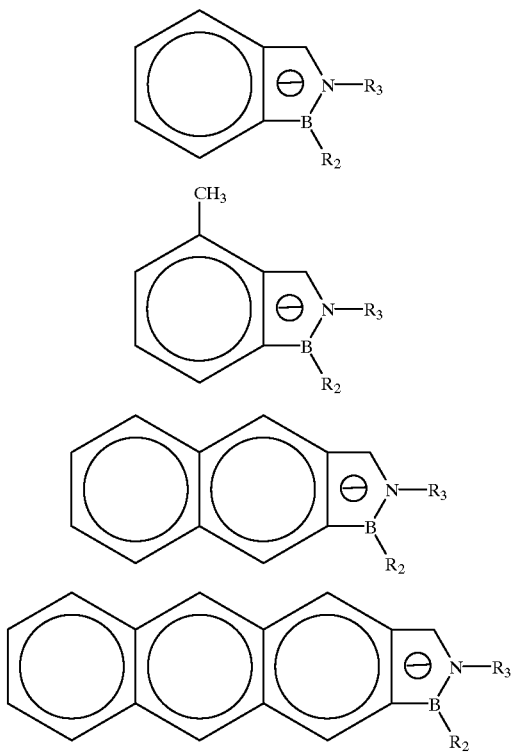

Examples of metallocene catalysts containing a 1,2-azaborolinyl ring include:

(1-tert-butyl-2-methyl azaborolinyl)zirconium trichloride;

(1-tert-butyl-2-ethyl azaborolinyl)zirconium trichloride;

(1-tert-butyl-2-phenyl azaborolinyl)zirconium trichloride;

(1-trimethylsilyl-2-methyl azaborolinyl)zirconium trichloride;

(1-trimethylsilyl-2-phenyl azaborolinyl)zirconium trichloride; and (1-methyl-2-methyl azaborolinyl)zirconium trichloride.

Pyrrolyl and Phospholyl Catalysts

L can have the structure:

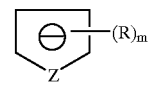

where Z is N or P, and is preferably N. Examples include 2-methylpyrrolyl, 3-methylpyrrolyl, 2,5-dimethylpyrrolyl, 2,5-di-tert-butylpyrrolyl, aryl substituted pyrrolyl rings such as 2-phenylpyrrolyl, 2,5-diphenylpyrrolyl, indolyl, alkyl substituted indolyls or their phosphoindenyl analogues such as 2-methylindolyl, 2-tert-butylindolyl, 3-butylindolyl, 7-methylindolyl, 4,7-dimethylindolyl, aryl substituted indolyls such as 2-phenylindolyl, 3-phenylindolyl, 2-naphthylindolyl, isoindolyl, and alkyl and aryl substituted isoindolyls having the formulas:

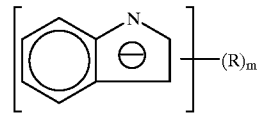

indolyl

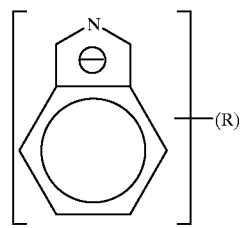

isoindolyl and carbazolyl and alkyl substituted carbazolyls having the formula:

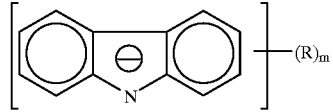

and their phospho analogues. The alkyl and aryl substituents (R) on the pyrrolyl ring-containing ligand are not on the nitrogen atom in the ring but are on the carbon atoms of the ring.

Examples of metallocene catalysts containing pyrrolyl or phospholyl rings include:

(1-phospha-2,3,4,5-tetramethylcyclopentadienyl) zirconium trichloride;

(1-phospha-2,3,4,5-tetramethylcyclopentadienyl) zirconium trimethyl;

(1-phospha-2,3,4,5-tetramethylcyclopentadienyl) zirconium tribenzyl;

(1-phospha-2,3,4,5-tetramethylcyclopentadienyl) zirconium methyldichloride;

(1-phospha-2,3,4,5-tetramethylcyclopentadienyl) zirconium trihydride;

(1-phospha-3,4-diphenylcyclopentadienyl) zirconium trichloride;

(1-phospha-3,4-diphenylcyclopentadienyl) zirconium trimethyl;

(1-phospha-3,4-diphenylcyclopentadienyl) zirconium tribenzyl;

(1-phospha-3,4-diphenylcyclopentadienyl) zirconium methyldichloride;

(1-phospha-3,4-diphenylcyclopentadienyl) zirconium trihydride;

(1-phospha-3,4-dimethylcyclopentadienyl) zirconium trichloride;

(1-phosphaindenyl) zirconium trichloride;

(1-phospha-3-methoxycarbonylcyclopentadienyl) zirconium trichloride;

(1,3-diphospha-4,5-diphenylcyclopentadienyl) zirconium trichloride;

(1,2,4-triphospha-3,5-diphenylcyclopentadienyl) zirconium trichloride;

(1,2,3,4-tetraphospha-5-phenylcyclopentadienyl) zirconium trichloride;

(pentaphosphacyclopentadienyl) zirconium trichloride;

(1-phospha-3-benzoyloxycyclopentadienyl) zirconium trichloride;

(imidazolyl) zirconium trichloride;

(imidazolyl) zirconium trimethyl;

(imidazolyl) zirconium tribenzyl;

(imidazolyl) zirconium methyldichloride;

(imidazolyl) zirconium trihydride;

(pyrazolyl) zirconium trichloride;

(1,2,3-triazolyl) zirconium trichloride;

(1,2,4-triazolyl) zirconium trichloride;

(tetrazolyl) zirconium trichloride; and (pentazolyl) zirconium trichloride.

Bridging

The L group can be bridged to the L' group with various bridging groups that are known in the art such as methylene, ethylene, 1,2-phenylene, dimethyl silyl, diphenyl silyl, diethyl silyl, and methyl phenyl silyl.

The preferred bridging groups are ethylene and silyl as those catalysts are easier to make. Normally, only a single bridge is used in a catalyst. It is believed that bridging the two ligands changes the geometry around the catalytically active transition metal and improves catalyst activity and other properties, such as comonomer incorporation and thermal stability.

Cocatalyst

An aluminum-containing cocatalyst is required in the process of this invention. The cocatalyst can be either an alkyl aluminum derivative or an alkyl aluminoxane.

Alkyl aluminum cocatalysts have the general formula $R'''_p AlX'_{(3-p)}$, where $R'''$ is alkyl from $C_1$ to $C_{50}$, $X'$ is hydrogen, halogen, alkoxy, phenoxy, amino, imino, amido, or $OR''''$, where $R''''$ is alkyl, aryl, or

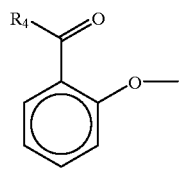

where $R_4$ is hydrogen, alkoxy, or alkyl, and p is 1 to 3. The trialkyl aluminum cocatalysts can be made by several methods known in the art, such as adding dialkyl aluminum hydrides to olefins, and the Ziegler reaction of isobutyl aluminum with long chain olefins. The other alkyl aluminum cocatalysts are prepared by reaction of the trialkyl aluminum compound with the appropriate alcohol, phenol, amine, or amide derivative.

Alkyl aluminoxane cocatalysts have the general formula $-(O-Al-R_5)_q$ or $(O-Al-R_5)_q(O-Al-R_6)_r$, where $R_5$ and $R_6$ are independently selected from $C_1$ to $C_{50}$ alkyl, and q+r is 5 to 100. If q+r is less than 5 the cocatalyst is hard to make and if q+r is more than 100 the catalyst becomes insoluble; q+r is preferably about 10 to about 30. The preferred cocatalysts are $(O-Al-CH_3)_q$ and $(O-Al-CH_3)_q(O-Al-isobutyl)_r$ because they are available commercially. Examples of these cocatalysts include poly(methylaluminoxane) (PMAO), poly(isobutylaluminoxane) (PBAO), poly(octylaluminoxane) (POAO), and poly(methyl) (i-butyl)aluminoxane) (MMAO).

The mole ratio of cocatalyst to catalyst should be about 1 to about 2000 as at mole ratios less than 1 the cocatalyst is ineffective and mole ratios over 2000 are unnecessary. The amount of cocatalyst used is inversely proportional to the molecular weight (MW) of the resulting PVC (i.e., a higher MW is obtained if less cocatalyst is used and a lower MW is obtained if more cocatalyst is used). The preferred molar ratio of cocatalyst to catalyst depends on the molecular weight desired and can be in the range of about 2 to about 500 moles per mole of catalyst.

Base

Up to about 500 moles per mole of aluminum in said cocatalyst of a Lewis base can be included, if desired, as part of the catalyst system. The purpose of the Lewis base is to increase the activity of the catalyst, enhance the quality of the PVC produced, and control the molecular weight of the PVC. The presence of the Lewis base lowers the molecular weight of the catalyst, probably by facilitating the transfer of alkyl groups from the cocatalyst to the growing polymer chain. Examples of bases that can be used in this invention include oxygen-containing bases, such as ethers (e.g., diethylether, dibutylether, tetrahydrofuran (THF), and 1,2-dimethoxyethane) and esters (e.g., n-butylphthalate, ethylbenzoate, and ethyl p-anisate), nitrogen-containing bases such as pyridine and tertiary amines (e.g., triethylamine), and phosphorus-containing bases, such as phosphines (e.g., triethyl phosphine, tributyl phosphine, and triphenyl phosphine, $PPh_3$). The amount of base is preferably about 2 to about 300 moles per mole of aluminum in the cocatalyst as less base results in a less active catalyst and lowers the quality of the PVC and more base is unnecessary and usually must be removed from the PVC. Many bases are solvents for this process, and the amount of base used is preferably less than the amount at which it begins to act as a solvent.

Polymerization

The polymerization proceeds only in the presence of light. While ultraviolet light (UV) can be used, it is not necessary, and visible light is also effective. Any source of light can be used, such as, for example, fluorescent lamps, incandescent lamps, or halogen lamps. However, to obtain significant yields, a light source with a radiated output in the UV or visible region of the spectrum of at least 1 W per 100 ml reaction volume is necessary; radiation of at least about 10 W is preferred.

The polymerization is preferably performed at room temperature, although it can be performed at higher or lower temperatures if desired. No solvent is needed in the process of this invention. The VCM is polymerized as a liquid, which can be achieved by cooling to below −15° C. at atmospheric pressure or at higher temperatures under pressure, such as at a pressure of about 345 kPa (about 50 psi) at a temperature of about 20 to about 30° C. The polymerization normally takes about 1 to about 6 hours and is performed in a glass vessel or an opaque vessel fitted with means to permit exposure of the VCM to light. The PVC is produced as a powder which precipitates from the excess VCM. Excess VCM is removed and methanol is added to kill the catalyst and cocatalyst and help precipitate the PVC from the VCM. The solid PVC is isolated by filtration.

The following examples further illustrate this invention. All the metallocene complexes used in the examples were either prepared according to literature procedures or purchased from Strem Chemicals, Aldrich Chemical Co., or Boulder Scientific Co. Some of the trialkylaluminum compounds were purchased from Aldrich Chemicals Co., while others were prepared using known procedures. The alkylaluminoxane solutions were purchased from AKZO Inc. VCM was purchased from Aldrich Chemicals and purified by passing the vapors through a calcined (200° C.) molecular sieve column.

General Polymerization Procedures

Method A. A catalyst/cocatalyst/base mixture was charged to a dry Pyrex 100 ml pressure tube in a dry box. The pressure tube was evacuated, cooled with an ice bath, and pressurized with VCM. After condensation of the required amount of monomer, the closed reactor with the stirred mixture was heated to the required temperature and irradiated with a light source. After a specific reaction time, the excess VCM was removed and the residue quenched with excess methanol. The precipitated PVC was filtered, washed with methanol, and dried.

Method B. A dry reactor (100 ml Pyrex pressure tube or 1000 ml borosilicate Buchi reactor) was evacuated, cooled with an ice bath or constant temperature bath, and pressurized with VCM. After condensation of the required amount of monomer, the catalyst/cocatalyst system and the modifier were charged to the closed reactor. The stirred mixture at the required temperature was exposed to a light source. After a specific reaction time, the excess VCM was removed and the residue quenched with excess methanol. The precipitated PVC was filtered, washed with methanol, and dried.

Results

1. Metallocenes with poly(alkylaluminoxane) cocatalysts

Active catalysts for VCM polymerization were generated from metallocene dichloride precursors and different polyalkylaluminoxane cocatalysts.

1.1 Preliminary studies—Polymerization in dark

Initial polymerization reactions were conducted in Pyrex pressure tubes at ambient illumination (fume-hood, no direct light source) and were considered to be "dark" polymerizations, even though no special measures were taken to shield the reaction vessels. Initially, the attempted polymerization of VCM in toluene solution using bis (cyclopentadienyl)zirconium dichloride (see formula 1) or bis(pentamethylcyclopentadienyl)zirconium dichloride (see formula 2) with methylaluminoxane did not produce PVC. When the polymerization was conducted in bulk using the metallocenes (formula 1), bis(2-methylindenyl)zirconium dichloride (formula 3) and rac- (racemic) dimethylsilyl(2-methyindenyl)zirconium dichloride (formula 4) with poly (methylaluminoxane) (PMAO) and modified poly (methylaluminoxane) (MMAO) some polymerization was observed (Table 1), but the color of the resulting product was usually yellow to dark brown, especially when MMAO was used as the cocatalyst. $^1$H NMR spectra of the polymer samples contained intense signals in the area of olefinic protons, indicating that the product was partially dehydrochlorinated. However, when a Lewis base, such as tetrahydrofuran (THF) was added to the catalyst system, the dehydrochlorination process was inhibited without influencing significantly the catalyst activity. Apparently, the base coordinates to the metallocenium cation and/or the aluminum atom of the cocatalyst, thereby greatly reducing the Lewis acidity of the catalytic system. The catalysts used had the following formulas:

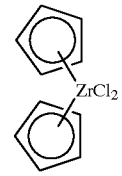

1

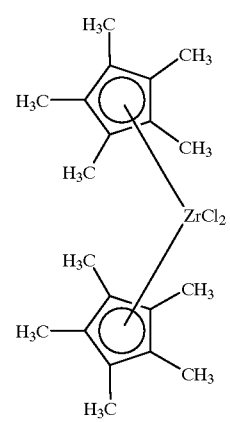

2

3

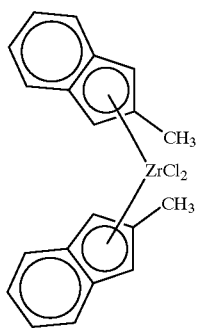

4

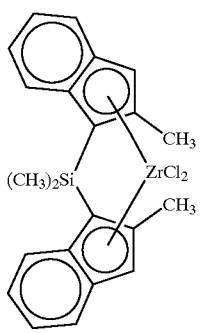

5

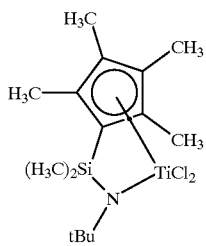

where "tBu" is tertiary butyl.

1.2 Photopolymerization—effect of reaction conditions on activity

During preliminary screening experiments, it was observed that the polymer yield significantly increased when the reaction mixture in the Pyrex reactor was illuminated. Data presented in Table 2 indicates that the polymerization of VCM can be efficiently photoinitiated by different light sources in visible and UV area of the spectrum. Further polymerization experiments were conducted using a 200 watt incandescent light bulb as the visible light source. A number of titanium and zirconium metallocene complexes were tested with an MMAO cocatalyst and a THF base in VCM polymerization (Table 3). The activity of the catalytic systems varied over a broad range, from negligible in case of titanocene dichloride, to reasonably high (more than 130 kg of PVC per mole of transition metal) in case of the "constrained geometry" dimethylsilyl (tetramethylcyclopentadienyl) (t-butylamido)titanium dichloride complex (formula 5) and ansa-bis(indenyl) complex (formula 4). The indenylzirconium complexes were found to be generally more active with MMAO cocatalyst, and among the various systems examined, the commercially available, silicon-bridged ansa-bis(indenyl) complex (formula 4) had the highest activity. Hence, further studies on catalyst systems were based on the complex in formula 4.

Experiments with different level of catalyst concentrations indicate that the activity (kg PVC/mole of metal) is higher at the lower catalyst level (Table 4) indicating the presence of some kind of bimolecular catalyst deactivation process. All the polyalkylaluminoxane cocatalysts tested with the metallocene complex of formula 4 had comparable activities (Table 5). The activity of the catalyst system increases only slightly with increasing Zr/Al ratio, as determined in experiments using the formula 4/MMAO/THF catalyst system (Table 6).

As mentioned hereinabove, polymerization of VCM with a catalyst system metallocene/alkylaluminoxane, unmodified with a base, such as THF, produces a yellow, partially dehydrochlorinated PVC. Other bases, such as anisole, triphenylphosphine, triethylamine, and diethyl ether, were also successful in inhibiting the degradation of PVC by the catalyst system. The activity of the catalytic system varied only slightly as a function of the type of base used. An exception was pyridine, which drastically lowered the catalyst activity (Table 7). Experiments with a THF-modified catalyst system showed that the Al/THF ratio did not influence the polymerization activity significantly (Table 8) and THF can even be used as a solvent. Other solvents, such as toluene or heptane, can also be used without significant changes in the activity of the metallocene-based catalyst (Table 9).

Tables 10 and 11 show the results from large scale polymerization of VCM using a metallocene photoinitiator in an 1 L borosilicate glass reactor.

1.3. Tacticity of PVC

The tacticity of PVC was accurately and easily determined using $^3$H-decoupled $^{13}$C NMR spectra of the polymer. FIG. 1 shows the partial spectrum in the methine (CHCl) carbon region for a THF-$d_8$ solution of a PVC sample made with a new catalyst. It consisted of three well-separated peaks, characteristic of the rr (syndiotactic), mr (atactic) and mm (isotactic) triads. These triad peak areas were used to obtain values for $P_r$, the probability of syndiotactic placement of the monomer unit. This value corresponds to the tacticity of the polymer and was simply obtained from the equation $P_r=(rr)+0.5(mr)$. The tacticity of PVC samples made using radical initiators depends upon the temperature of polymerization. The $P_r$ values vary between 0.545 for the polymer made at 90° C. and 0.62 for a low temperature product made at −30° C., indicating an increase in the syndiotacticity with decreasing polymerization temperature. Remarkably, the tacticity of polymers photoinitiated by the metallocene catalysts was not sensitive to variation in metallocene structure (Table 2) and is similar to that usually observed in traditional free radical polymerization.

1.4. Molecular Weight

Figure 2:
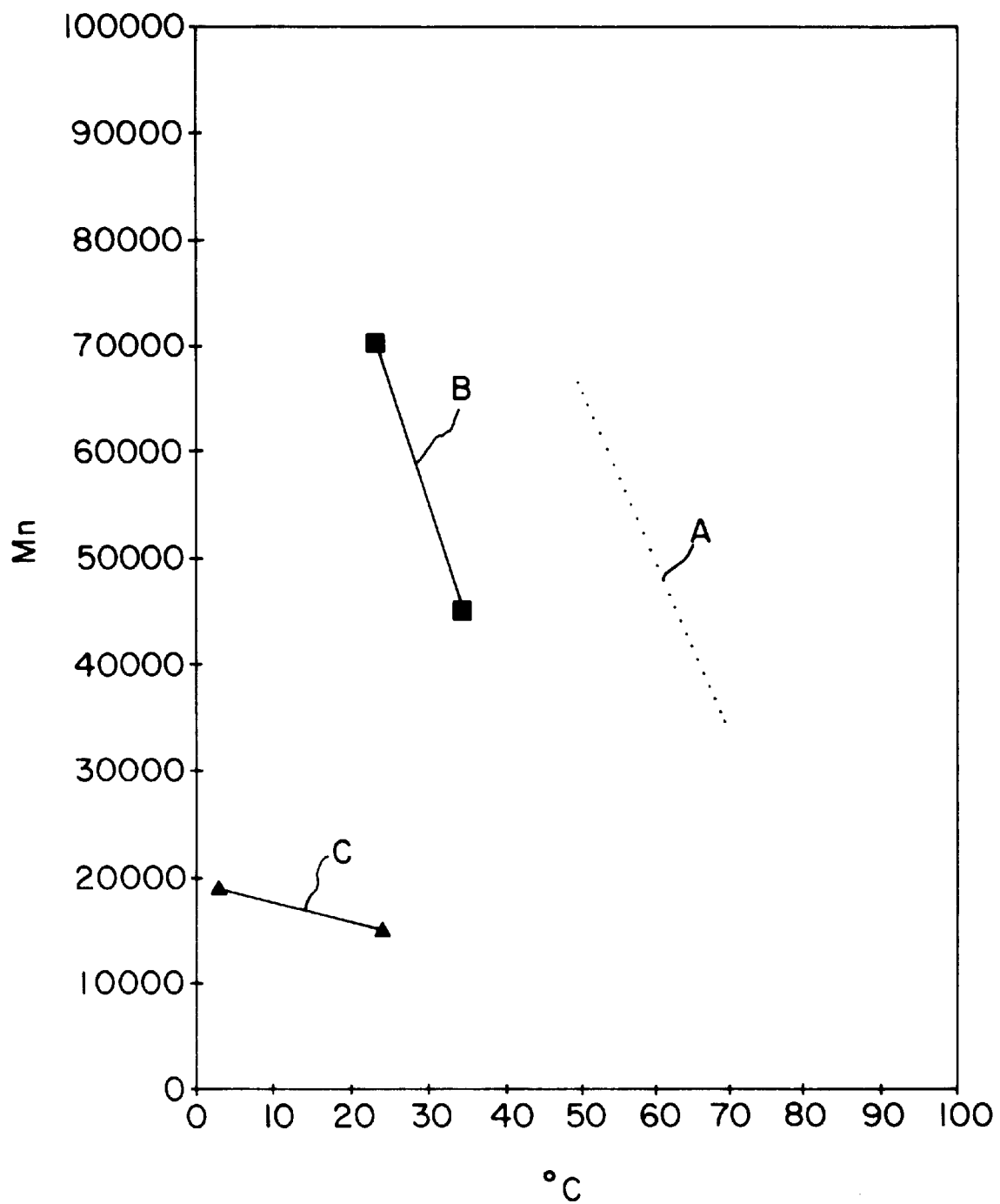
FIG. 2 shows the relationship between polymerization temperature (°C.) and number average molecular weight ($M_n$) for commercial PVC and PVC prepared according to this invention.

Values of number average molecular weight, $M_n$, in Tables 2–9 indicate that the degree of polymerization of VCM in the presence of metallocene photoinitiator systems is quite sensitive to variation in catalyst composition. In traditional free-radical polymerization processes the molecular weight of PVC is almost totally dependent on the polymerization temperature (FIG. 3). In general, the molecular weight of our PVC samples was significantly lower than what one might expect with traditional free-radical initiators. FIG. 2 gives the relationship between polymerization temperature and molecular weight for commercial PVC (line A), the catalyst of formula (4) with an MMAO cocatalyst in THF (line B), and the catalyst of formula (4) with an MMAO cocatalyst in anisole (line C).

Besides temperature, the nature of the base used to modify the cocatalyst also exerted a major influence on the molecular weight. When anisole or triphenylphosphine was used as the base, ultra-low molecular weight ($M_n$<20,000) PVC was obtained (Table 7) at ambient temperature in bulk. The intrinsic viscosity of these samples in cyclohexane at 30° C. is expected to be less than 0.4 (or K<40). Polymerization in solvents tended to reduce the molecular weight, apparently through chain transfer to the solvent (Table 9). Increasing the catalyst concentration also tended to decrease the molecular weight. The polydispersity of the PVC samples (mostly between 2.5 and 3.0) was slightly higher than the values characteristic for traditional free-radical polymerization (2.0 to 2.5).

TABLE 1

VCM Polymerization in Bulk with Metallocene Catalysts in "Dark".[a] (Conditions:

| Metallocene | Cocatalyst | Temperature, °C. | Base additive | Activity, g PVC/mole Zr |
|---|---|---|---|---|
| 1[b] | PMAO | 50 | none | 19,200 |
| 1[b] | MMAO | 50 | none | 19,800 |
| 3[c] | MMAO | 40 | none | 24,700 |
| 1[b] | PMAO | 50 | THF | 10,000 |
| 1[b] | MMAO | 50 | THF | 11,000 |
| 3[c] | MMAO | 40 | THF | 41,200 |
| 4[b,d] | MMAO | 50 | THF | 24,800 |

[a] Conditions: 15 ml VCM, Zr = 0.0000038 moles; Al/THF molar ratio = 1.
[b] Al/Zr ratio = 156.
[c] Al/Zr ratio = 235.
[d] Polymerization time was 3 hours.

Table 2. Effect of light source on vinyl chloride photopolymerization in bulk with rac-dimethylsilyl(2-methylindenyl)zirconium dichloride (4) /MMAO/THF catalyst system.[a]

TABLE 2

Effect of light source on vinyl chloride photopolymerization in bulk with rac-dimethylsilyl (2-methylindenyl)zirconium dichloride (4) /MMAO/THF catalyst system.[a]

| Light Source | Activity, g PVC/mole Zr | Mn | Poly-dispersity | I(0.9)/I(4.1) Ratio [b] |
|---|---|---|---|---|
| Dark | 15,700 | — | — | 54 |
| 200 W incand, 2 inch | 86,000 | 38,100 | 2.8 | 2.2 |
| 2 × 200 W incand, 2 inch | 126,000 | 39,500 | 3.1 | 3.5 |
| 750 W incand., 3 inch | 110,000 | 35,700 | 3.0 | 2.2 |
| 150 W Cole-Parmer fiberoptic incandesc., no filter | 78,000 | 31,000 | 2.8 | — |
| 150 W Cole-Parmer fiberoptic incandesc., red | 26,000 | 59,700 | 2.1 | — |
| 150 W Cole-Parmer fiberoptic incandesc., green | 11,000 | — | — | — |
| 150 W Cole-Parmer fiberoptic incandesc., yellow | 69,000 | 63,400 | 2.3 | — |
| 150 W Cole-Parmer fiberoptic incandesc., blue | 73,000 | 30,700 | 2.7 | — |
| 150 W Cole-Parmer fiberoptic incandesc., violet | 69,000 | 36,700 | 2.5 | 3.6 |
| 100 W Hanovia, med.pres Hg | 69,000 | 27,700 | 2.9 | 3.0 |
| 15 W GE "black" light [c] | 88,000 | 43,400 | 2.6 | — |
| 15 W GE "black" light [d] | 237,000 | 50,100 | 2.9 | — |

[a] Conditions: 15 ml VCM, 0.00000756 moles Zr, Al/Zr ratio = 215, Al/THF mol.ratio = 1, 1 hour, 30° C.
[b] Relative ratio of $^1$H NMR peak heights of terminal alkyl group at 0.9 ppm to terminal allyl chloride at 4.1 ppm.
[c] 3 hours at 50° C.
[d] 3 hours

TABLE 3

Vinyl Chloride Photopolymerization in Bulk with Metallocene/MMAO/THF catalyst system.[a]

| Metallocene | Activity, g PVC/mole M | Mn | Polydis-persity | Pr | I(0.9)/I(4.1) Ratio |
|---|---|---|---|---|---|
| Biscyclopentadienyl-titanium dichloride | trace | n/a | n/a | n/a | n/a |
| rac-Ethylenebis(tetra-hydroindenyl)titanium dichloride | 129,500 | 48,000 | 3.5 | 0.569 | 4.6 |
| Dimethylsilyl(tetra-methycyclopentadienyl)(t-butyl-amido)titanium dichloride | 139,000 | 66,700 | 3.7 | 0.568 | 5.0 |
| Biscyclopentadienyl-zirconium dichloride | 61,000 | 45,700 | 2.5 | 0.578 | >5 |
| Bis(n-butylcyclopentadienyl)zirconium dichloride | 58,700 | 57,100 | 2.3 | — | — |
| Bis(1,3-dimethylcyclopentadienyl)zirconium dichloride | 78,500 | 47,100 | 2.3 | 0.598 | 2.8 |
| Bis(pentamethylcyclopentadienyl)zirconium dichloride | 97,400 | 40,700 | 2.3 | 0.586 | 1.2 |
| Bis(2-methylindenyl) zirconium dichloride | 126,900 | 43,800 | 2.3 | 0.574 | 1.4 |
| Bis(4,7-dimethylindenyl) zirconium dichloride | 94,400 | 48,500 | 2.9 | — | — |
| rac-Dimethylsilyl(4-t-butyl-2-methylcyclopentadienyl)zirconium dichloride | 68,700 | 41,400 | 2.5 | 0.599 | 2.2 |
| rac-Ethylenebis(tetra-hydroindenyl)zirconium dichloride | 63,600 | 26,100 | 3.1 | 0.575 | 4.8 |
| rac-Ethylenebis(indenyl) zirconium dichloride | 107,800 | 38,800 | 2.9 | 0.572 | 4.0 |
| rac-Dimethylsilyl(2-methylindenyl) zirconium dichloride | 149,000 | 45,600 | 2.8 | 0.568 | 2.2 |
| Dimethylsilyl(cyclopentadienyl)(fluorenyl)zirconium dichloride | 69,000 | 43,800 | 2.9 | — | — |
| Propylidene(3-Methylcyclopentadienyl)(fluorenyl)zirconium dichloride | 41,000 | 43,800 | 2.9 | — | — |

[a]Conditions: 15 ml VCM, 0.0000038 moles metallocene, MMAO cocatalyst (AKZO), Al/Zr ratio 215, 0.06 ml THF, 1 hour, 35° C., 200 W incandescent light source at 2 inch distance).

TABLE 4

Effect of Catalyst Concentration on Vinyl Chloride Photopolymerization in Bulk with rac-Dimethylsilyl(2-methylindenyl)zirconium Dichloride (4) /MMAO/THF Catalyst System.[a]

| Zr complex concentration, mmoles/l | Yield of PVC, g | Activity, g PVC/mole Zr | Mn | Poly-dispersity | I(0.9)/I(4.1) Ratio |
|---|---|---|---|---|---|
| 0.126 | 0.305 | 161,400 | 44,600 | 2.3 | — |
| 0.252 | 0.563 | 149,000 | 45,600 | 2.7 | 2.2 |
| 0.252 [b] | 0.797 | 210,800 | 38,700 | 3.6 | — |
| 0.504 | 0.650 | 86,000 | 38,100 | 2.8 | 3.0 |
| 1.007 | 0.752 | 50,000 | 33,000 | 2.8 | 5.3 |
| 2.013 | 1.261 | 41,800 | 26,500 | 2.7 | 6.0 |

[a] Conditions: 15 ml VCM, Al/Zr ratio = 215, Al/THF molar ratio = 1, 1 hour, 30° C., 200 W incandescent light source at 2 inch distance).
[b] 2 hours polymerization time.

TABLE 5

Effect of Aluminoxane Cocatalyst on Vinyl Chloride Photopolymerization in Bulk with rac-Dimethylsilyl(2-methylindenyl)zirconium Dichloride (4) /AO/THF Catalyst System.[a]

| Aluminoxane | Activity, g PVC/mole Zr | Mn | Poly-dispersity | I(0.9or1.1)/I(4.1) Ratio [b] |
|---|---|---|---|---|
| Methyl (PMAO, AKZO) | 134,700 | 46,100 | 2.7 | 3.0 |
| Methyl/I-Butyl (3/1, MMAO, AKZO) | 145,200 | 45,600 | 2.7 | 2.2 |
| I-Butyl (O/Al - 0.65; AKZO) | 92,000 | 34,500 | 2.3 | — |
| I-Butyl (O/Al - 0.8; AKZO) | 100,000 | — | — | 5.0 |
| Octyl (O/Al - 0.8) | 60,000 | 49,400 | 2.5 | 35 |

[a] Conditions: 15 ml VCM, Zr = 0.0000038; Al/Zr ratio = 215, Al/THF molar ratio = 1, 1 hour, 30° C., 200 W incandescent light source at 2 inch distance).
[b] Relative ratio of $^1$H NMR peak heights of terminal alkyl group at 0.9 or 1.1 ppm to terminal allyl chloride at 4.1 ppm.

TABLE 6

Effect of Al/Zr Ratio on Vinyl Chloride Photopolymerization in Bulk with rac-Dimethylsilyl(2-methylindenyl)zirconium Dichloride (4) /MMAO/THF Catalyst System.

| Al/Zr Ratio | Activity, g PVC/mole Zr | Mn | Poly-dispersity | End groups, I(0.9)/I(4.1) |
|---|---|---|---|---|
| 145 | 84,600 | 36,600 | 2.4 | 1.7 |
| 215 | 86,000 | 38,100 | 2.8 | 3.0 |
| 290 | 96,700 | 38,900 | 2.6 | 4.3 |

[a] Conditions: 15 ml VCM, 0.00000756 moles Zr, Al/THF molar ratio 1, 1 hour, 35° C., 200 W incandescent light source at 2 inch distance.

TABLE 7

Effect of Base on Vinyl Chloride Photopolymerization in Bulk with rac-Dimethylsilyl(2-methylindenyl)zirconium Dichloride (4) /MMAO/Base Catalyst System.[a]

| Base | Activity, g PVC/mole Zr | Mn | Polydispersity | I(0.9)/I(4.1) Ratio |
|---|---|---|---|---|
| none [b] | 41,300 | — | — | — |
| THF | 81,900 | 39,200 | 2.4 | 2.1 |
| Et$_2$O | 86,000 | 36,700 | 2.4 | 1.7 |
| Anisole | 83,300 | 12,200 | 2.3 | — |
| Anisole [c] | 111,200 | 13,100 | 2.3 | 10 |
| Pyridine | 31,000 | — | — | — |
| Et$_2$N | 82,800 | 32,800 | 2.2 | >12 |
| Ph$_3$P | 102,500 | 14,100 | 2.0 | >80 |

[a] Conditions: 15 ml VCM, 0.00000756 moles Zr, Al/Zr ratio = 215, Al/base ratio = 0.5, 1 hour, 35° C., 200 W incandescent light source at 2 inch distance.
[b] Yellow, partially dehydrochlorinated PVC
[c] Al/Anisole = 1.

TABLE 8

Effect of Al/THF Ratio on Vinyl Chloride Photopolymerization in Bulk with rac-Dimethylsilyl(2-methylindenyl)zirconium Dichloride (4) /MMAO/THF Catalyst System.[a]

| Al/THF Molar Ratio | Activity, g PVC/mole Zr | Mn | Polydispersity | I(0.9)/I(4.1) Ratio |
|---|---|---|---|---|
| No THF [b] | 41,300 | — | — | — |
| 5.9 | 56,300 | — | — | — |
| 3.0 | 101,200 | 38,700 | 2.5 | 1.9 |
| 1.4 | 86,000 | 38,100 | 2.8 | 2.2 |
| 0.7 | 81,900 | — | — | 2.1 |
| large excess [c] | 120,800 | 13,400 | 2.1 | — |

[a] Conditions: 15 ml VCM, 0.00000756 moles Zr, Al/Zr ratio = 215, 1 hour, 35° C., 200 W incandescent light source at 2 inch distance).
[b] Yellow, partially dehydrochlorinated PVC
[c] Used 7.5 ml THF as solvent

TABLE 9

Effect of Solvent on Vinyl Chloride Photopolymerization with rac-Dimethylsilyl(2-methylindenyl)zirconium Dichloride (4) /MMAO/THF Catalyst System.[a]

| Solvent (Amount) | Activity, g PVC/mole Zr | Mn | Polydispersity | I(0.9)/I(4.1) Ratio |
|---|---|---|---|---|
| none (bulk) | 86,000 | 38,100 | 2.8 | 2.2 |
| THF (7.5 ml) | 120,800 | 13,400 | 2.1 | — |
| THF (7.5 ml) [b] | 213,100 | 13,500 | 2.1 | — |
| heptane (7.5 ml) | 82,407 | 28,300 | 2.6 | 3.0 |
| toluene (20 ml) | 101,300 | 17,000 | 2.1 | 1.3 |

[a] Conditions: 15 ml VCM, 0.00000756 moles Zr, Al/Zr ratio = 215; if THF is not the solvent, Al/THF ratio = 1, 1 hour, 35° C., 200 W incandescent light source at 2 inch distance).
[b] With 150 W + 125 W lamps, 1 inch distance, 2 hours
[c] 3 hour run

TABLE 10

Photopolymerization of VCM: Scale-up Data for
Catalyst System (rac-Dimethylsilyl(2-methylindenyl)
zirconium dichloride/MMAO/THF) (Method B)

| VCM (g) | Catalyst (mmol) | Cocat (mmol) | THF (ml) | PVC (g) | $^x$VCM (%) | Cat Act (kg/mol) | $M_n$ | $M_w$ | PDI |
|---|---|---|---|---|---|---|---|---|---|
| 226 | 0.063 | 13.82 | 1.1 | 10.0 | 4.4 | 159 | 67000 | 219900 | 3.3 |
| 246 | 0.063 | 13.82 | 1.1 | 17.2 | 7.0 | 273 | 70500 | 234400 | 3.3 |
| 190 | 0.05  | 10.98 | 0.9 | 11.9 | 6.3 | 238 | 78700 | 241234 | 3.1 |
| 237 | 0.063 | 13.82 | 1.1 | 14.2 | 6.0 | 225 | 77800 | 227500 | 2.9 |

1) Catalyst MW: 476; MMAO solution (0.73 g/cc) contains 7% Al w/w; A;/Zr mole ratio ≅ 219 for all runs; temperature = 25° C.; pressure = 45 psi; agitation = 500 rpm; time = 4.5 hours.
2) White incandescent light was used for irradiation in runs 7739-14, 17, 21 and 23 (2 × 200 W lamps) 1" from the reactor except in 7739-14 (2.5" away); 100 W UV light source at 3" from reactor was used in run 7739-34.

TABLE 11

Photopolymerization of VCM: Scale-up Data for Catalyst System A2
(rac-Dimethylsilyl(2-methylindenyl) zirconium dichloride/MMAO/Anisole)

| VCM (g) | Catalyst (mmol) | Cocat (mmol) | Anisole (ml) | T (° C.) | P (psig) | Agitation (rpm) | Run Time (h) | PVC (g) | $^x$VCM (%) | Cat Act (kg/mol) | M | Mw | PDI |
|---|---|---|---|---|---|---|---|---|---|---|---|---|---|
| \multicolumn{14}{c}{Incandescent White Light (2 × 200 W lamps; 1" from reactor)} |
| 476 | 0.126 | 27.63 | 3.0 | 25 | 45 | 500 | 3.5 | 26.5 | 5.6 | 210 | 11166 | 27404 | 2.5 |
| 453 | 0.126 | 27.63 | 3.0 | 25 | 45 | 500 | 3.5 | 24.5 | 5.4 | 194 | 14900 | 34600 | 2.3 |
| 386 | 0.101 | 22.1  | 2.4 | 25 | 47 | 100 | 3.5 | 16.3 | 4.2 | 161 | 14800 | 37300 | 2.5 |
| 400 | 0.101 | 22.1  | 2.4 | 5  | 27 | 500 | 4.0 | 20.0 | 5.0 | 198 | 19000 | 51500 | 2.7 |
| 395 | 0.083 | 18.1  | 2.0 | 25 | 47 | 500 | 4.0 | 18.3 | 4.6 | 220 | 15700 | 37900 | 2.4 |
| 383 | 0.111 | 24.4  | 2.7 | 25 | 50 | 500 | 4.0 | 20.0 | 5.2 | 180 | 18147 | 43523 | 2.4 |
| \multicolumn{14}{c}{UV Light (100 W; 3" from reactor)} |
| 377 | 0.111 | 24.4  | 2.7 | 25 | 47 | 500 | 4.0 | 34.2 | 9.1 | 308 | 14425 | 39545 | 2.7 |
| 394 | 0.111 | 24.1  | 2.7 | 25 | 47 | 500 | 1.0 | 14.8 | 3.8 | 133 | 11771 | 28945 | 2.5 |
| 382 | 0.111 | 24.1  | 2.7 | 25 | 48 | 500 | 2.0 | 22.1 | 5.8 | 199 | 13462 | 37458 | 2.8 |

1) Catalyst MW: 476; MMAO solution (0.73 g/cc) contains 7% Al w/w; Al/Zr mole ratio 219 for all runs.
2) Catalyst solution was added in 4 portions (3.6/3.5/3.5/1 ml); 1st portion added at the beginning and subsequent portions at 1 hour intervals.

1.5. Nature of end groups

Figure 3A:
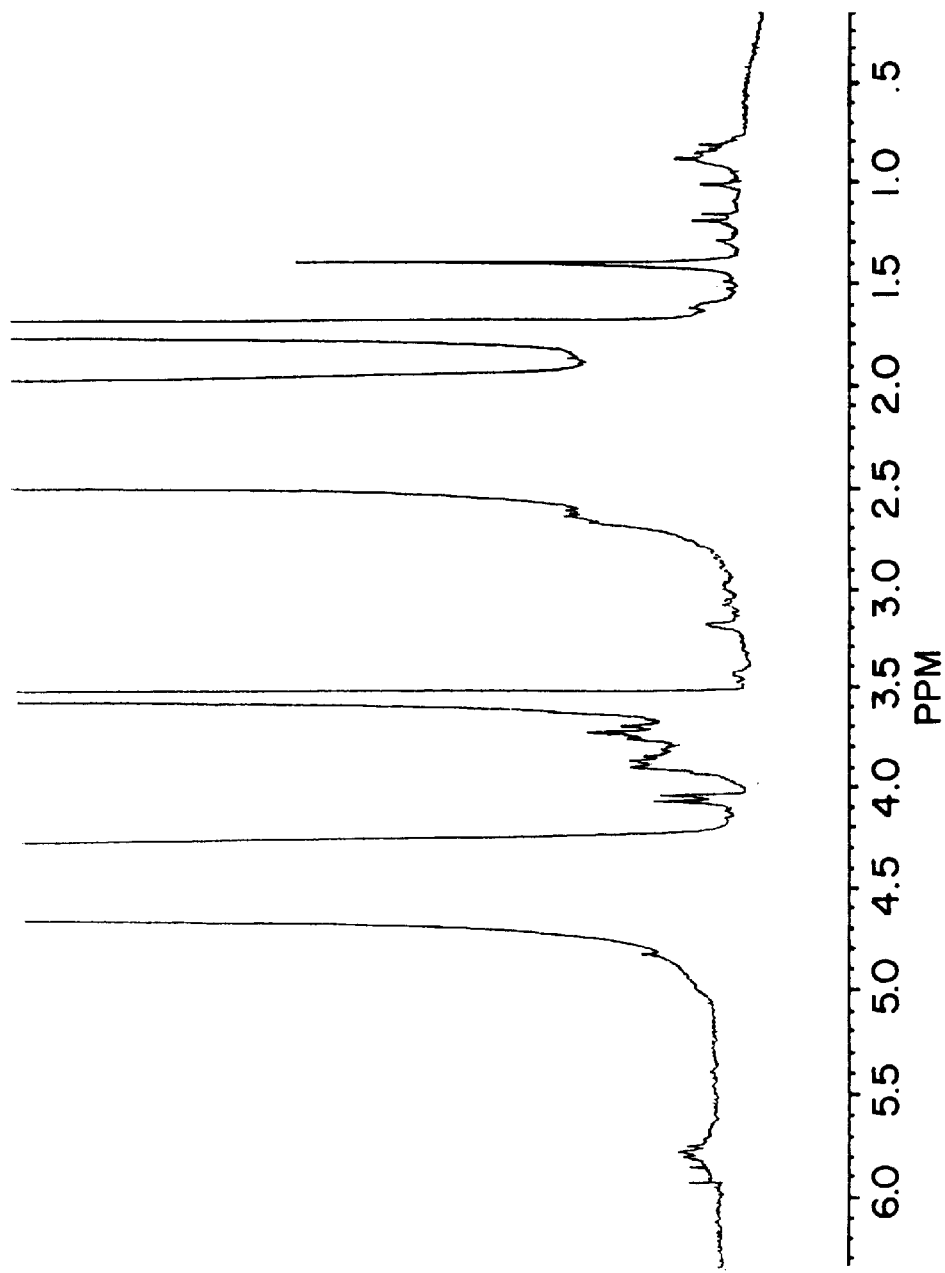
FIGS. 3a and 3b are proton NMR spectra of commercial PVC.
Figure 3B:
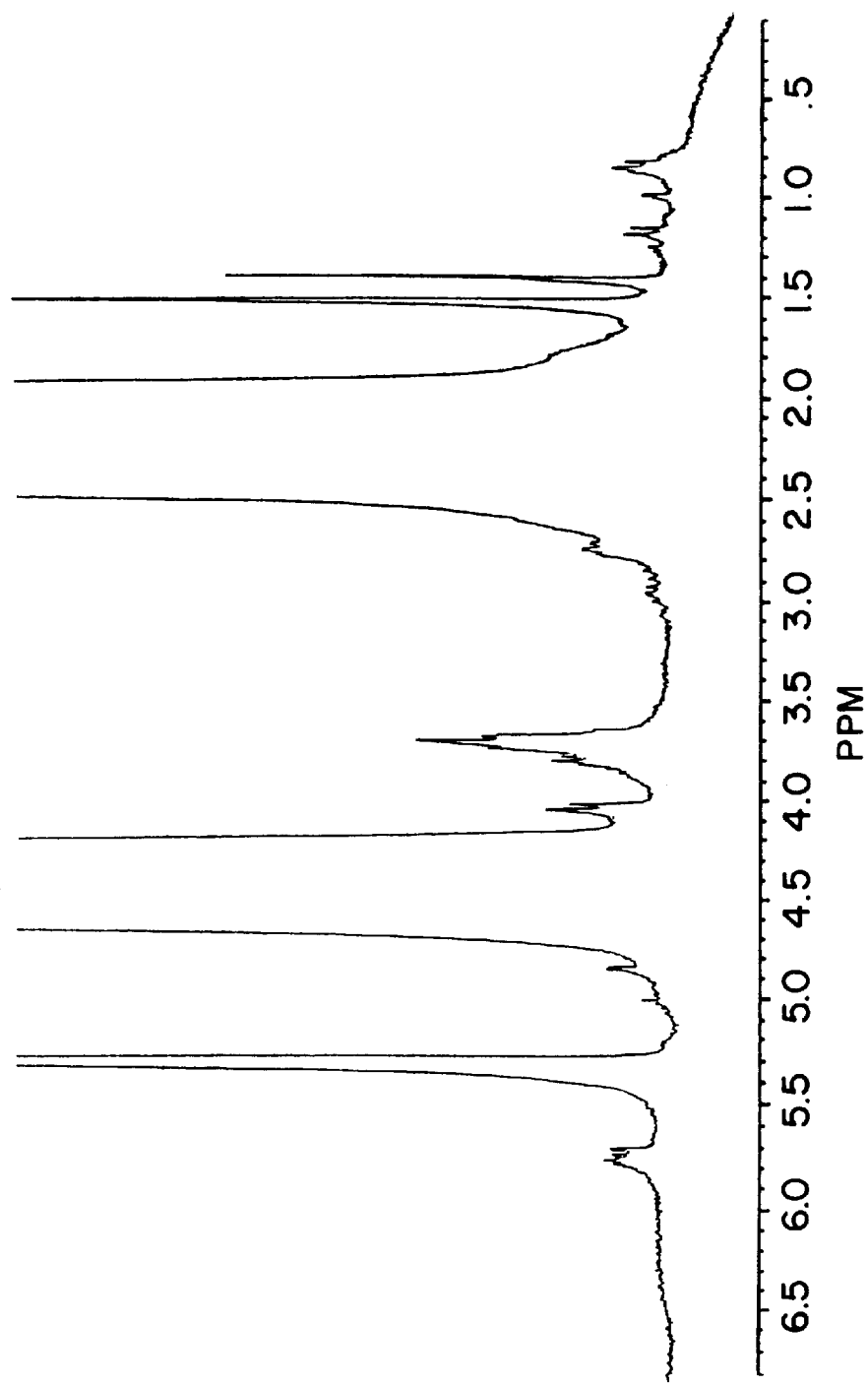

Proton NMR spectra of commercial PVC in THF-$d_8$ and $CD_2Cl_2$, shown in FIGS. 3a and 3b, respectively, contains a number of signals corresponding to the end groups and irregularities discussed hereinabove.

Figure 4A:
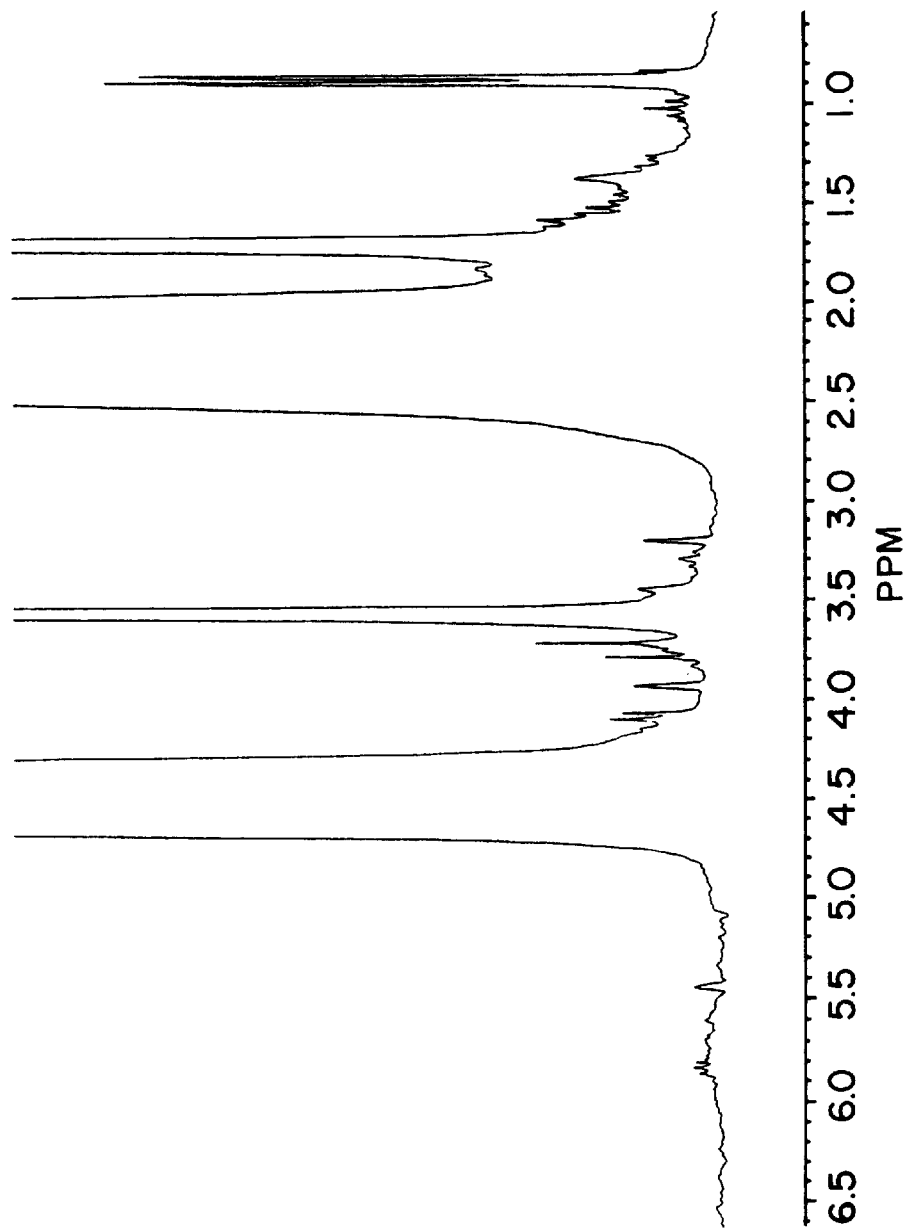
FIGS. 4a and 4b show the spectra of PVC samples prepared according to this invention.
Figure 4B:
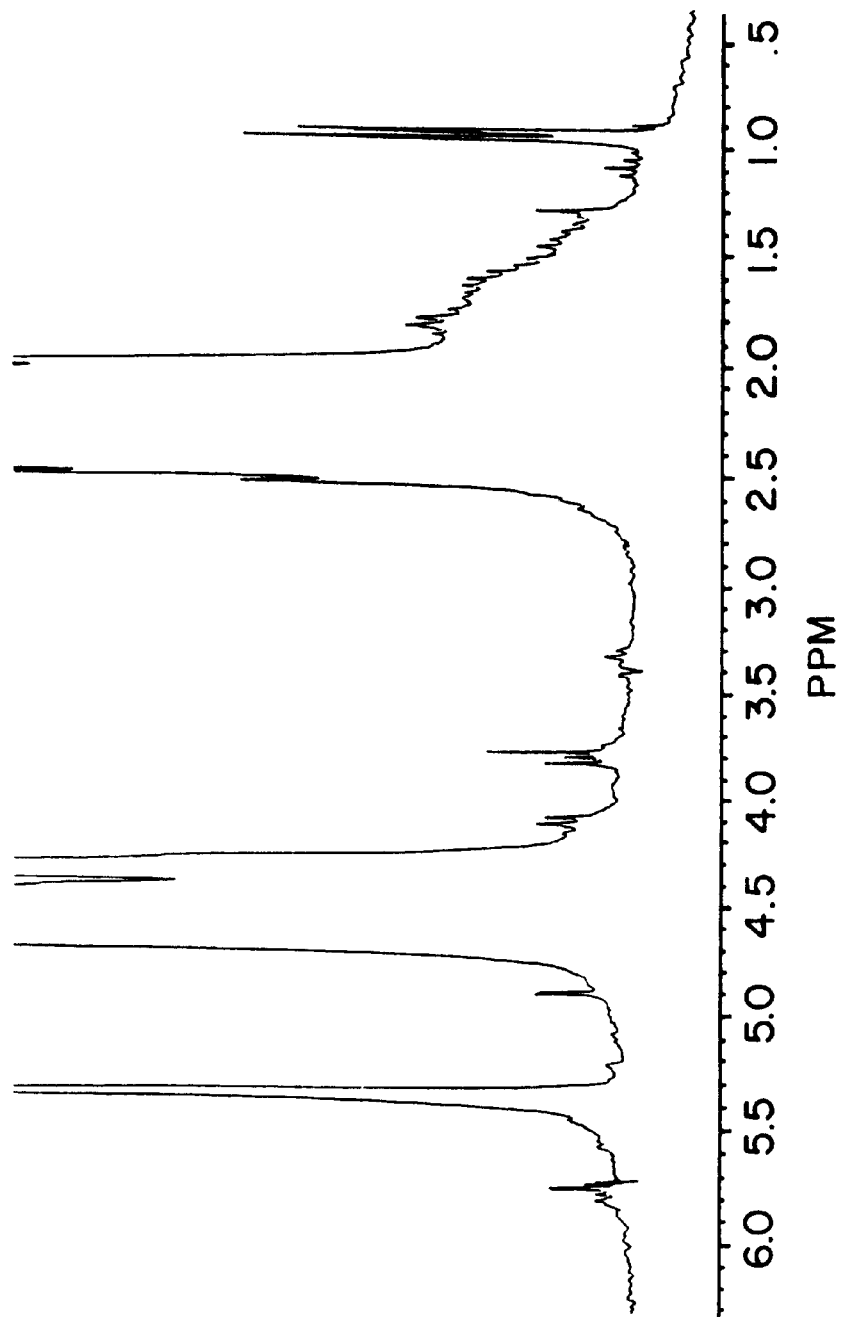

FIG. 4a and 4b show the spectra in THF-$d_8$ and $CD_2Cl_2$, respectively, of a PVC sample made in the photopolymerization process initiated with the catalytic system, formula (4)/MMAO/anisole. The major difference between these spectra and those in FIG. 3 is the presence of intensive doublets at 0.9 ppm corresponding to isopropyl groups. Multiplets in the region of 1.4–2.0 ppm in FIG. 4b appear to correspond to the methylene and methine protons in an end group such as CHCl—$CH_2$—CH($CH_3$)$_2$. The ratio of the intensities I(0.9)/I(4.1) of the isopropyl doublet at 0.9 ppm to the doublet at around 4.1 ppm is 4.0, which is therefore a rough estimate of the ratio of isobutyl end groups to unsaturated end groups in the PVC produced by the photopolymerization. This observation in combination with the fact that the molecular weight of the PVC made with the metallocene photoinitiated system was much lower than that characteristic for the traditional free-radical PVC, implies that there is an initiation and chain transfer mechanism involving the alkyl groups of the aluminum cocatalysts. The data in Table 6, indicating that the relative number of alkyl end-groups increased when the Al/Zr ratio increased, also supports this idea. When PMAO or POAO was used as the cocatalyst, the NMR spectra of the polymer samples showed the incorporation of the corresponding alkyl groups into the chain, most likely as end ("starting") groups.

Another notable difference between the traditional polymer samples and those made using the formula (4)/MMAO/anisole catalyst system is the low level or apparent absence of saturated chloromethyl branches or end-groups in the new polymer.

1.6. Glass transition temperature

Differential scanning calorimetry (DSC) was used to determine the glass transition temperature ($T_g$) of the PVC samples. Commercial PVC has a $T_g$ of about 85° C., and the value is influenced by the polymerization temperature. The $T_g$ value also could be a reflection of changes in syndiotacticity/crystallinity and/or Mn of the polymer. In FIG. 5, line A shows the $T_g$ values as a function of Mn for commercial PVC samples (Aldrich standard samples with inherent viscosity 0.51, 1.02 and 1.6), and line B (solid square in anisole, hollow square in THF) shows the $T_g$ values for some experimental resins photopolymerized according to this invention. The new polymer samples of this invention appear to have a slightly higher glass transition temperature than commercial PVC at the same $M_n$ values, but both types of PVC samples show similar trends in $T_g/M_n$ dependence.

1.7. Product morphology

The PVC samples made by the photopolymerization process are powdery materials. A scanning electron micrograph of the product obtained by photopolymerization in bulk using the catalyst system, formula (4)/MMAO/anisole at 23° C. (blade agitator at 500 rpm) shows that the samples are loose agglomerates of 0.3–0.5 micron size particles.

2. Metallocenes with Trialkylaluminum and Modified Analogues as Catalysts 2.1 Polymerizations in "Dark"

Preliminary "dark" experiments were carried out with zirconocene dichloride (1) under ambient light in a fumehood where the lights were turned off. Under these conditions, the yield of PVC and catalyst activity was generally low. Based on experience with the "dark" polymerizations with the bridged bis(indenyl) catalyst (4), it was found that the addition of a coordinating base to the reaction system generally gave PVC with improved yield and substantially less discoloration. During this investigation it was found that the addition of the base 2'-hydroxyacetophenone afforded higher yields of PVC. Several "dark" experiments were conducted using different aluminum cocatalysts, such as trimethylaluminum, triethylaluminum, triisobutylaluminum, trioctylaluminum, diethylaluminum hydride, diethylaluminum ethoxide, and diethylaluminum chloride in combination with 2'-hydroxyacetophenone. It was found that the yield of PVC was the highest when trioctylaluminum in combination with 2'-hydroxyacetophenone in a 1:2 molar ratio, respectively, was used as the cocatalyst. Some other systems, notably, diethylaluminum hydride, also showed good activity.

In order to verify the necessity for having illumination to polymerize VCM, we carried out the process with the same catalyst system after taking precautions to completely exclude the ambient light that was used in the "dark" experiments. Only a trace amount of PVC resulted. This clearly demonstrated that light was necessary for polymerizing VCM with the catalyst system of this invention. Subsequent experiments showed that if the reaction mixture was illuminated with light, the yield of PVC increased dramatically. The potential of this novel photopolymerization process was tested using the best candidate, 1:2 (octyl)$_3$Al/2'-hydroxyacetophenone. This catalyst system differs from the one used in the study with the silicon-bridged catalyst (4) (Section 1) in one major respect, viz., the co-catalyst. In the case of catalyst 4, catalyst activation was achieved with methylaluminoxane, whereas with catalyst 1, activation was achieved with trioctylaluminum modified with 2'-hydroxyacetophenone.

2.2 Photopolymerization

Effect of Reaction Variables on Activity and Polymer Properties

Various experiments were carried out to determine the effect of reaction variables on catalyst activity and the nature the PVC produced. In all cases, the cocatalyst was either trioctylaluminum or a base-modified version thereof. The effect of changing the light source was investigated by using incandescent lamps of varying power, and the results are shown in Table 12. Catalyst activity was directly proportional to intensity of light incident on the Carius tube reactor. The $M_n$ was inversely proportional to light intensity at the reactor. Hence, $M_n$ decreased in the reverse order relative to catalyst activity. When toluene was used as a co-solvent, catalyst activity was generally higher than that observed in bulk reactions but $M_n$ dropped drastically. Proton NMR spectra of the PVC produced clearly showed the presence of the octyl group with the terminal methyl group appearing as a triplet. The relative ratio of alkyl end groups (resulting from trioctylaluminum), to terminal allyl chloride group was generally higher in the bulk reactions than in the toluene-containing runs.

Table 12. Effect of Light Source on Vinyl Chloride Photopolymerization with bis(Cyclopentadienyl)zirconium Dichloride (1) /1:2 (Octyl)$_3$Al/2'-Hydroxyacetophenone Catalyst System.[a]

TABLE 12

Effect of Light Source on Vinyl Chloride Photopolymerization with bis(Cyclopentadienyl)zirconium Dichloride (1) /1:2 (Octyl) $_3$Al/2'-Hydroxyacetophenone Catalyst System.[a]

| Light Source, Distance | Activity, g PVC/mole Zr | Mn | Poly-dispersity | I(0.9)/I(4.1)[b] |
|---|---|---|---|---|
| Dark | Trace | — | — | — |
| 200 W incand, 2 inch [c] | 166,000 | 12,700 | 2.2 | 1.64 |
| 200 W incand, 2 inch [d] | 109,000 | 27,800 | 3.0 | 4.87 |
| 2 × 200 W incand, 2 inch [d] | 163,900 | 19,300 | 2.3 | 2.00 |
| 750 W incand., 4.5 inch [c] | 139,000 | 12,800 | 2.1 | 1.49 |
| 750 W incand, 4.5 inch [d] | 125,000 | 20,600 | 3.3 | 7.05 |

[a] Conditions (unless otherwise stated): 15 ml VCM, 0.0000036 moles Zr, Al/Zr ratio = 16, Al/2'-hydroxyacetophenone mol.ratio = 0.5, 1 hour, 30° C.
[b] Relative ratio of $^1$H NMR peak heights of terminal alkyl group to terminal allyl chloride group.
[c] With 15 mL toluene as co-solvent
[d] In bulk Variation in the structure of the metallocene resulted in quite a wide variation in catalytic activity. Results are shown in Table 13. Among the systems examined, the most active catalysts were zirconocene dichloride (1) (>160 Kg PVC/g mole Zr) and the silicon-bridged bis-indenyl zirconium dichloride (4) (>190 Kg PVC/g mole Zr). The other systems were only moderately active. The $M_n$ in all cases was sharply lower, by a factor of about 2–3, than those polymers obtained when MMAO was used as the cocatalyst (Compare Tables 3 and 13). Only minor differences in the relative intensities of the terminal alkyl and allyl chloride groups were seen in the proton NMR spectra of the PVC produced from these reactions.

The effect of catalyst concentration was examined with toluene as the solvent. At relatively lower catalyst concentrations, there appeared to be an increase in catalyst activity upon increasing the amount of the catalyst. However, at much higher concentrations, catalyst activity fell sharply (See Table 14), perhaps due to a bimolecular deactivation similar to that proposed earlier for the metallocene 4.

As mentioned hereinabove, the alkyl end groups observed in the PVC were believed to come from chain transfer of the alkyl group from the alkylaluminum to the growing PVC chain. Hence, it was thought that if the Al/Zr ratio was increased, more efficient chain transfer would occur, such that the growing PVC chain would be terminated at a shorter chain length. This would result in a lower molecular weight for PVC with enhanced intensity for the alkyl end group in the $^1$H NMR spectrum. This trend was indeed observed when the Al/Zr ratio was increased from 16 to 128 in bulk polymerization (Table 15), where $M_n$ decreased from 27,800 to 17,100, and the relative ratio of terminal alkyl to terminal allyl chloride peak intensity increased.

TABLE 13

Vinyl Chloride photopolymerization in Bulk with Metallocene/1:2 (Octyl)$_3$Al/2'-Hydroxyacetophenone Catalyst System.[a]

| Metallocene | Activity, g PVC/mole M | Mn | Poly-dispersity | Pr | I(0.9)/I(4.1)[b] |
|---|---|---|---|---|---|
| Bis(cyclopenta-dienyl(zirconium dichloride | 163,900 | 19,300 | 2.3 | 0.547 | 2.00 |
| Dimethylsilyl(tetra-methycyclopenta dienyl)(t-butyl-amido)titanium dichloride | 72,200 | 15,400 | 2.2 | 0.565 | 3.20 |
| rac-Dimethylsilylbis(2-methylindenyl) zirconium dichloride | 190,500 | 19,900 | 2.3 | 0.560 | 2.31 |
| Bis(cyclopenta-dienyl)titanium dichloride | 62,500 | 17,200 | 2.5 | — | 2.67 |
| (cyclopenta-dienyl)titanium trichloride | 49,000 | 19,200 | 2.3 | — | 1.33 |
| (Cyclopenta-dienyl)zirconium trichloride | 86,600 | 15,900 | 2.3 | 0.552 | 2.38 |
| (Pentamethyl-cyclopentadienyl) zirconium trichloride | 65,600 | 16,700 | 2.3 | — | 1.81 |
| Bis(cyclopenta-dienyl)zirconium difluoride | 54,000 | 21,500 | 2.9 | 0.572 | 2.92 |

[a]Conditions: 15 ml VCM, 0.0000036 moles metallocene, 2:1 molar ratio of 2'-hydroxyacetophenone/(Oct)$_3$Al cocatalyst, Al/Zr ratio 16, 1 hour, 30° C., 2 × 200 W incandescent light source at 2 inch distance
[b]Relative ratio of $^1$H NNR peak heights of terminal alkyl group to terminal allyl chloride group.

Table 14. Effect of Catalyst Concentration on Vinyl Chloride Photopolymerization with bis (Cyclopentadienyl) zirconium Dichloride (1) /1:2 (Octyl)$_3$Al/2'-Hydroxyacetophenone Catalyst System.[a]

TABLE 14

Effect of Catalyst Concentration on Vinyl Chloride Photopolymerization with bis(Cyclopentadienyl)zirconium Dichloride (1)/1:2 (Octyl)$_3$Al/2'-Hydroxyacetophenone Catalyst System.[a]

| Zr complex concentration, mmoles/l | Yield of PVC, g | Activity, g PVC/mole Zr | Mn | Poly-dispersity | I(0.9)/I(4.1) |
|---|---|---|---|---|---|
| 0.121 | 0.256 | 140,700 | 13,100 | 2.0 | 1.66 |
| 0.242 | 0.604 | 166,400 | 12,700 | 2.2 | 1.64 |
| 0.484 | 0.448 | 124,400 | 21,500 | 2.9 | 3.62 |
| 1.210 | 0.38 | 20,900 | 13,200 | 2.1 | 2.03 |

[a] Conditions: 15 ml VCM, 15 mL toluene, Al/Zr ratio = 16, Al/2'-hydroxyacetophenone molar ratio = 1, 1 hour, 30° C., 200 W incandescent light source at 2 inch distance).

Table 15. Effect of Al/Zr Ratio on Vinyl Chloride Photopolymerization with bis(Cyclopentadienyl)zirconium Dichloride (1) /1:2 (Oct)$_3$Al/2'-Hydroxyacetophenone Catalyst System.[a]

TABLE 15

Effect of Al/Zr Ratio on Vinyl Chloride Photopolymerization with bis(Cyclopentadienyl)zirconium Dichloride (1) /1:2 (Oct) $_3$Al/2'-Hydroxyacetophenone Catalyst System. [a]

| Al/Zr Ratio | Activity, g PVC/mole Zr | Mn | Polydispersity | I(0.9)/I(4.1) |
|---|---|---|---|---|
| 128[b] | 81,300 | 9,500 | 2.1 | 3.17 |
| 8[c] | 135,600 | 25,300 | 2.7 | 3.00 |
| 16[c] | 109,000 | 27,800 | 3.0 | 4.87 |
| 128[c] | 61,900 | 17,100 | 2.7 | 5.43 |

[a] Conditions (unless otherwise stated): 15 ml VCM, 0.00000756 moles Zr, Al/THF molar ratio 1, 1 hour, 35° C., 200 W incandescent light source at 2 inch distance)
[b] With 15 mL toluene as solvent
[c] In bulk from 4.87 to 5.43.

When toluene was used as a solvent at Al/Zr ratio of 128, the $M_n$ dropped further to 9,500, which is due to an additional pathway for chain transfer to the solvent. Also, catalyst activity increased significantly with a decreasing Al/Zr ratio.

Since the molecular weight of the PVC and control of its end groups are influenced by the chain transfer ability of the alkylaluminum compound, a series of different bases, capable of coordinating with the alkylaluminum compound, were examined to determine their effect on VCM polymerization. Trioctylaluminum was chosen as the base cocatalyst and zirconocene dichloride (1) as the catalyst. Modification was done in two broad ways. In one case, different bases were added to trioctylaluminum, and in the other, different bases were added to the 1:2 complex of trioctylaluminum and 2'-hydroxyacetophenone. In both cases, profound differences were found for catalyst activity and molecular weight. The results are shown in Table 16. Trioctylaluminum by itself was not a good cocatalyst, having an activity of only about 48.6 Kg/g mole Zr. Bases based on phenols were examined. It appears that compounds related to 2'-hydroxyacetophenone, such as 2'-hydroxy-3-phenylpropiophenone (Table 16), that have protons alpha to the carbonyl group greatly increase the catalyst activity. A $^1$H NMR study of the interaction of 2'-hydroxyacetophenone with isobutylaluminum (chosen instead of (octyl)$_3$Al for ease of interpretation of spectra) in toluene-d$_8$ showed the presence of all three possible products resulting from protonolysis of 1,2 or all 3 C—Al bonds. A similar process should be occurring in the case of (octyl)$_3$Al. Clearly, for chain transfer to occur, there has to be at least one octyl group on the aluminum. Remarkably, 1,3-dicarbonyl compounds related to acetylacetone rendered the cocatalyst inactive. The addition of simple Lewis bases such as anisole and PPh$_3$ gave comparable moderate activity. However, the molecular weight dropped sharply with PPh$_3$ as compared to anisole. The addition of Lewis bases to the 1:2 complex of (octyl)$_3$Al and 2'-hydroxyacetophenone generally resulted in good catalyst activity. With the exception of PPh$_3$, the molecular weight was relatively unaffected by the addition of the Lewis base. It appears that addition of triphenylphosphine increases the chain transfer ability of the cocatalyst and lowers the molecular weight of PVC significantly. A similar trend was seen earlier with the base-modified system comprising the bridged catalyst (4) with MMAO cocatalyst.

When the solvent is capable of facilitating chain transfer from the octylaluminum, there was generally an increase in catalyst activity (Table 17) with a concomitant decrease in molecular weight. In heptane, the molecular weight was significantly higher than in toluene or THF. Increasing the amount of VCM used in the bulk phase photopolymerization increases the molecular weight of PVC (Table 18). The drop in catalyst activity upon going from 15 mL VCM to 7–8 mL VCM is perhaps due to greater catalyst deactivation at the relatively higher Zr-concentration by some bimolecular process.

Table 16. Effect of Bases on Vinyl Chloride Photopolymerization with bis(cyclopentadienyl)-zirconium Dichloride (1)/(Oct)$_3$Al Catalyst System.[a]

TABLE 16

Effect of Bases on Vinyl Chloride Photopolymerization with bis(cyclopentadienyl)-zirconium Dichloride (1)/(Oct)$_3$Al Catalyst System.[a]

| Modifier | Activity, g PVC/ mole Zr | $M_n$ | Poly-dispersity | I(0.9)/ I(4.1) |
|---|---|---|---|---|
| None[b] | 48,600 | 36,413 | 3.2 | n/a |
| 2'-Hydroxyacetophenone[b,d] | 109,000 | 27,800 | 3.0 | 4.87 |
| 2-Cyanophenol | 18,500 | — | — | |
| 2-Hydroxybenzophenone | 34,200 | — | — | |
| 2,6-Di-t-butylphenol | 17,100 | — | — | |
| 2'-Hydroxy-3-phenyl-propiophenone | 98,900 | 23,800 | 2.3 | 2.32 |
| Pyrrolidine[c] | 22,000 | — | — | |
| 1,3-Pentanedione | Trace | — | — | |
| 2,2,6,6-Tetramethyl-3,5-heptanedione | Trace | — | — | |
| 2'-Hydroxyacetophenone phenyl imine | Trace | — | — | |
| Anisole[b,d] | 69,200 | 41,800 | 2.4 | 0.67 |
| Anisole[b,e] | 60,000 | 52,000 | 2.6 | 4.33 |
| Triphenylphosphine[b,e] | 53,300 | 18,900 | 3.8 | 10.75 |
| Triphenylphosphine[b,e,f] | 105,100 | 19,500 | 2.9 | 4.12 |
| THF[b,c,f] | 113,900 | 24,100 | 2.9 | 3.20 |
| THF[b,f,g] | 137,500 | 25,600 | 2.8 | 2.40 |
| tert-Butyl methyl ether[b,c,f] | 103,600 | 24,800 | 3.2 | 4.00 |
| Diphenyl ether[b,c,f] | 77,200 | 27,800 | 2.9 | 4.80 |

[a]Conditions (unless otherwise stated): 15 mL VCM, 10 mL toluene, 0.0000036 moles Zr, Al/Zr ratio = 16, Al/Modifier ratio 0.5, 1 hour, 35° C., 150 W incandescent lamp at 2" distance).
[b]In bulk. With 200 W lamp at 2" distance.
[c]Al/Base mole ratio = 1
[d]Al/Anisole mole ratio = 0.5
[e]Al/Base mole ratio = 2
[f]With 1:2 complex of (Oct)$_3$Al/2'-hydroxyacetophenone; 200 W incandescent lamp at 2" distance
[g]Al/THF mole ratio = 0.1

Table 17. Effect of Solvent on Vinyl Chloride Photopolymerization with bis(Cyclopentadienyl)zirconium Dichloride (1)/1:2 (Oct)$_3$Al/2'-Hydroxyacetophenone Catalyst System.[a]

TABLE 17

Effect of Solvent on Vinyl Chloride Photopolymerization with bis(Cyclopentadienyl)zirconium Dichloride (1)/1:2 (Oct)$_3$Al/2'-Hydroxyacetophenone Catalyst System.[a]

| Solvent | Activity, g PVC/mole Zr | Mn | Polydispersity | I(0.9)/I(4.1) |
|---|---|---|---|---|
| None[b] | 109,300 | 27,800 | 3.0 | 4.87 |
| THF | 155,400 | 8,340 | 2.2 | 1.47 |
| Toluene | 166,400 | 12,700 | 2.2 | 1.64 |
| Heptane | 118,700 | 20,800 | 3.1 | 4.61 |

[a] Conditions (unless otherwise stated): 15 ml VCM, 15 mL solvent, 0.0000036 moles Zr, Al/Zr ratio = 16, 1 hour, 35° C., 200 W incandescent light source at 2 inch distance)
[b] In bulk.

Table 18. Effect of Amount of VCM on Vinyl Chloride Photopolymerization with bis(cyclopentadienyl)zirconium dichloride (1)/1:2 (Oct)$_3$Al/2'-Hydroxyacetophenone catalyst system.[a]

TABLE 18

Effect of Amount of VCM on Vinyl Chloride Photopolymerization with bis(cyclopentadienyl)zirconium dichloride (1)/1:2 (Oct) $_3$Al/2'-Hydroxyacetophenone catalyst system.[a]

| Amount of VCM (mL) | Activity, g PVC/mole Zr | Mn | Polydispersity | I(0.9)/I(4.1) |
|---|---|---|---|---|
| 7–8 | 96,100 | 11,700 | 2.3 | 2.00 |
| 15[b] | 163,900 | 19,300 | 2.3 | 2.00 |
| 30 | 159,000 | 25,000 | 2.5 | 2.00 |

[a] Conditions (unless otherwise stated): 0.0000036 moles Zr, Al/Zr ratio = 16, 1 hour, 30° C., 2 × 200 W incandescent light source at 2 inch distance)
[b] With 1 × 200 W incandescent bulb.

We claim:

1. A method of making alkyl terminated poly(vinyl chloride) comprising polymerizing vinyl chloride monomer in the presence of light, at least 1 W per 100 mL of reaction volume, a metallocene catalyst, about 1 to about 2000 moles of an aluminum and alkyl group-containing cocatalyst per mole of said catalyst, and up to about 500 moles of a Lewis base per mole of aluminum in said cocatalyst, whereby said alkyl group on said aluminum-containing cocatalyst is transferred to said poly(vinyl chloride).

2. A method according to claim 1 wherein said metallocene catalyst has the general formula

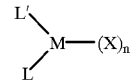

where each X is independently selected from halogen, alkyl from $C_1$ to $C_{30}$, oxyalkyl or oxyaryl from $C_1$ to $C_{30}$, or —N(R')$_2$, where each R' is independently selected from hydrogen, alkyl from $C_1$ to $C_{10}$, aryl from $C_6$ to $C_{15}$, alkaryl from $C_7$ to $C_{15}$, and aralkyl from $C_7$ to $C_{15}$, L is a ligand containing a cyclopentadienyl ring or an anionic heterocyclic ring that is isoelectronic with a cyclopentadienyl ring, L' is L or X, and n is 1, 2, or 3.

3. A method according to claim 2 wherein L has the formula

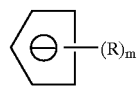

where each R is independently selected from hydrogen, silyl, germyl, cyano, R"OR", or halogen, where R" is a $C_1$ to $C_{20}$ hydrocarbyl group, or two R groups are joined together to form a $C_4$ to $C_6$ ring, and m is 1 to 5.

4. A method according to claim 3 where L is cyclopentadienyl or indenyl.

5. A method according to claim 2 where L is

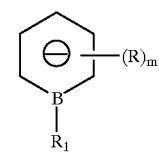

where each R is independently selected from hydrogen, silyl, germyl, cyano, R"OR", or halogen, where R" is a $C_1$ to $C_{20}$ hydrocarbyl group, or two R groups are joined together to form a $C_4$ to $C_6$ ring, $R_1$ is hydrogen, $N(R')_2$, OR', or R', each R' is independently selected from halogen, alkyl from $C_1$ to $C_{10}$, aryl from $C_6$ to $C_{15}$, and aralkyl from $C_7$ to $C_{15}$, and m is 1 to the maximum number of substituents allowable on the ring.

6. A method according to claim 5 wherein L is borabenzene, boranaphthalene, or boraanthracene.

7. A method according to claim 2 wherein L has the formula:

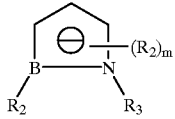

where $R_2$ is alkyl from $C_1$ to $C_{12}$ or aryl from $C_6$ to $C_{12}$ alkaryl from $C_6$ to $C_{12}$, aralkyl from $C_6$ to $C_{12}$, or $Si(R')_3$, $R_3$ is $R_2$, halogen, COR', COOR', SOR', or SOOR', R' is alkyl from $C_1$ to $C_{10}$, aryl from $C_6$ to $C_{15}$, alkaryl from $C_7$ to $C_{15}$, or aralkyl from $C_7$ to $C_{15}$, and m is 1 to the maximum number of substituents on the ring.

8. A method according to claim 7 wherein the $R_2$ group on the boron is alkyl from $C_3$ to $C_{12}$ or aryl, $R_3$ group is t-butyl or trimethylsilyl, and the $R_3$ group on the ring is hydrogen or methyl.

9. A method according to claim 1 wherein L is

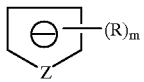

where R is independently selected from hydrogen, silyl, germyl, cyano, R"OR", or halogen, where R" is a $C_1$ to $C_{20}$ hydrocarbyl group, or two R groups are joined together to form a $C_4$ to $C_6$ ring, and m is 1 to the maximum number of substituents on the ring, Z is N or P, and m is 1 to the maximum number of substituents on the ring.

10. A method according to claim 1 wherein said aluminum containing cocatalyst has the general formula $R'''_pAlX'_{(3-p)}$, where R''' is alkyl from $C_1$ to $C_{50}$, X is hydrogen, halogen, alkoxy, phenoxy, amino, imino, amido, or OR"", where R"" is alkyl, aryl, or

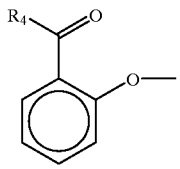

where $R_4$ is hydrogen, alkoxy, or alkyl, and p is 1 to 3.

11. A method according to claim 1 wherein said aluminum-containing cocatalyst has the general formula $-(O-Al-R_5)_q-$ or $(O-Al-R_5)_q(O-Al-R_6)_r-$, where $R_5$ and $R_6$ are independently selected from ($C_1$ to $C_{50}$) alkyl, and where q+r is 5 to 100.

12. A method according to claim 2 wherein M is zirconium, titanium, or hafnium.

13. A method according to claim 1 wherein the amount of said catalyst is about 2 to about 250 ppm.

14. A method according to claim 1 wherein the amount of said Lewis base is about 2 to about 300 moles per mole of aluminum in said catalyst.

15. A method according to claim 14 wherein said base is tetrahydrofuran.

16. A method according to claim 1 wherein said metallocene catalyst is selected from the group consisting of

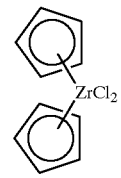

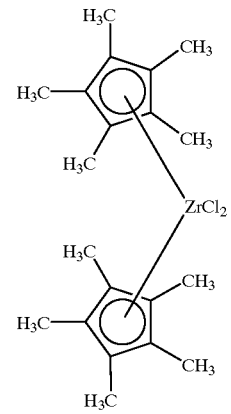

-continued

3
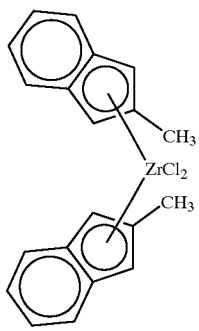

4
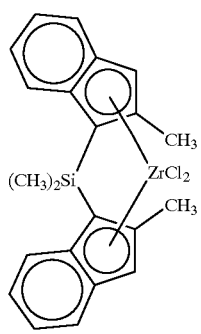

5
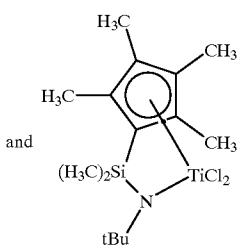

17. Poly(vinyl chloride) made according to the method of claim 1.

18. A method of producing poly(vinyl chloride) chains terminated with selected alkyl groups comprising
  (A) preparing a mixture of
    (1) vinyl chloride monomer;
    (2) a metallocene catalyst;
    (3) about 1 to about 2000 moles per mole of said catalyst of an aluminum-containing cocatalyst containing said selected alkyl groups; and
    (4) about 2 to about 300 moles of a Lewis base per mole of aluminum in said cocatalyst; and
  (B) exposing said mixture to at least about 1W output radiation in the ultraviolet or visible region, whereby said selected alkyl groups on said aluminum containing cocatalyst are transferred to the ends of said poly(vinyl chloride) chains.

19. A composition comprising vinyl chloride monomer, about 10 to about 250 ppm of a metallocene catalyst, about 1 to about 2000 moles of an aluminum-containing cocatalyst containing an alkyl group per mole of said catalyst, and up to about 500 moles of a Lewis base per mole of aluminum in said cocatalyst.

20. A composition according to claim 19 wherein the amount of said cocatalyst is about 50 to about 125 ppm, the amount of said cocatalyst is about 2 to about 500 moles per mole of said catalyst, and the amount of Lewis base is about 2 to about 300 moles per mole of aluminum in said cocatalyst.

21. Poly(vinyl chloride) made according to the method of claim 18.

22. A method of making poly(vinyl chloride) chains terminated with alkyl groups comprising exposing a composition according to claim 19 to at least about 1W of visible light.

23. Poly(vinyl chloride) made according to the method of claim 22.

24. A method of making poly(vinyl chloride) chains terminated with alkyl groups comprising exposing a composition according to claim 20 to at least about 1 W of visible light.

25. Poly(vinyl chloride) made according to the method of claim 24.

26. A method according to claim 1 wherein said Lewis base is present and is triphenylphosphine.

27. A method according to claim 1 wherein said Lewis base is present and is anisole.

28. A method according to claim 1 wherein said Lewis base is present and has a proton alpha to a carbonyl group.

29. A method according to claim 1 wherein said aluminum-containing cocatalyst is $(octyl)_3Al$ modified with 2 equivalents of hydroxyacetophenone.

30. A method according to claim 1 wherein said alkyl group contains 1 to 50 carbon atoms.

31. A method according to claim 1 wherein said light is visible light.

32. A method according to claim 2 wherein L is the same as L'.

33. A method according to claim 2 wherein L' is X and is bridged to L.

34. A method according to claim 2 wherein X is halogen or alkyl from $C_1$ to $C_4$.

35. A method according to claim 11 wherein said cocatalysts are $(O\text{---}Al\text{---}CH_3)_q$ or $(O\text{---}Al\text{---}CH_3)_q(O\text{---}Al\text{---}isobutyl)_r$.

* * * * *